(12) United States Patent
Yang et al.

(10) Patent No.: US 12,363,601 B2
(45) Date of Patent: Jul. 15, 2025

(54) COMMUNICATION METHOD AND APPARATUS

(71) Applicant: HUAWEI TECHNOLOGIES CO., LTD., Guangdong (CN)

(72) Inventors: Shuigen Yang, Shanghai (CN); Feng Han, Shanghai (CN); Yinghao Jin, Boulogne Billancourt (FR); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 17/704,362

(22) Filed: Mar. 25, 2022

(65) Prior Publication Data
US 2022/0217593 A1  Jul. 7, 2022

Related U.S. Application Data

(63) Continuation of application No. PCT/CN2020/115328, filed on Sep. 15, 2020.

(30) Foreign Application Priority Data

Sep. 26, 2019  (CN) .......................... 201910919493.1

(51) Int. Cl.
*H04W 36/06* (2009.01)
*H04W 36/00* (2009.01)
(52) U.S. Cl.
CPC ....... *H04W 36/06* (2013.01); *H04W 36/0064* (2023.05); *H04W 36/13* (2023.05)

(58) Field of Classification Search
CPC .......... H04L 41/0893; H04W 36/0064; H04W 36/06; H04W 36/13; H04W 36/0083;
(Continued)

(56) References Cited

U.S. PATENT DOCUMENTS

2018/0324645 A1  11/2018  Park et al.
2018/0352483 A1* 12/2018  Youn ..................... H04W 40/24
(Continued)

FOREIGN PATENT DOCUMENTS

| CN | 107770794 A | 3/2018 |
| CN | 108366365 A | 8/2018 |

(Continued)

OTHER PUBLICATIONS

Huawei, Intra-system, "Intra-RAT mobility in RRC_Connected," 3GPP TSG-RAN WG3 Meeting #95bis R3-171253, Spokane, USA, Apr. 3-7, 2017, 4 pages.
(Continued)

*Primary Examiner* — Khoa Huynh
(74) *Attorney, Agent, or Firm* — Fish & Richardson P.C.

(57) ABSTRACT

The disclosure provides communication methods and apparatuses. One example method includes receiving, by a first network device, a first message from a second network device, where the first message includes network slice configuration information. The network slice configuration information is used to indicate a maximum data rate provided by each of n network slices for a terminal device, and n is an integer greater than or equal to 1. In response to the received first message, the first network device sends a second message to the second network device.

20 Claims, 9 Drawing Sheets

(58) Field of Classification Search
CPC . H04W 36/26; H04W 72/27; H04W 28/0257; H04W 28/22; H04W 28/16; H04W 48/18

See application file for complete search history.

(56) References Cited

U.S. PATENT DOCUMENTS

| | | | |
|---|---|---|---|
| 2019/0159027 A1 | 5/2019 | Kuge et al. | |
| 2022/0116816 A1* | 4/2022 | Liang | H04W 48/04 |

FOREIGN PATENT DOCUMENTS

| | | |
|---|---|---|
| CN | 108668381 A | 10/2018 |
| CN | 109151924 A | 1/2019 |
| CN | 109257827 A | 1/2019 |
| CN | 109392038 A | 2/2019 |
| CN | 109792657 A | 5/2019 |
| CN | 110226337 A | 9/2019 |
| EP | 3634036 A1 | 4/2020 |
| WO | 2018228126 A1 | 12/2018 |
| WO | 2019007486 A1 | 1/2019 |

OTHER PUBLICATIONS

Extended European Search Report in European ApplN No. 20869389.5, dated Oct. 12, 2022, 13 pages.

3GPP TS 23.501 V16.2.0 (Sep. 2019), "3rd Generation Partnership Project; Technical Specification Group Services and System Aspects; System Architecture for the 5G System (5GS); Stage 2 (Release 16)," Sep. 2019, 389 pages.

3GPP TS 38.413 V15.4.0 (Jul. 2019), "3rd Generation Partnership Project; Technical Specification Group Radio Access Network; NG-RAN; NG Application Protocol (NGAP) (Release 15)," Jul. 2019, 328 pages.

Ericsson, "Core Network type restriction on "EPC" in 5GS subscription data," 3GPP TSG-SA WG2 Meeting #128bis, S2-187799, Sophia Antipolis, France, Aug. 20-24, 2018, 4 pages.

Huawei, HiSilicon, "Procedures for Small Data Rate Control," 3GPP TSG-SA WG2 Meeting #133, S2-1905610, Reno, USA, May 13-17, 2019, 33 pages.

Huawei, HiSilicon, "Procedures for Small Data Rate Control," 3GPP TSG-SA WG2 Meeting #133, S2-1906050, Reno, USA, May 13-17, 2019, 33 pages.

Nokia et al., "New WID Study on Enhancement of Network Slicing Phase 2," 3GPP TSG|WG-SA WG2 Meeting #134, S2-1908583, Sapporo, Japan, Jun. 24-28, 2019, 3 pages.

Nokia et al., "RDI handling for data forwarding at handover," 3GPP TSG-RAN WG2 Meeting #104, R2-1816412, Spokane, USA, Nov. 12-16, 2018, 4 pages.

Office Action issued in Chinese Application No. 201910919493.1 on Aug. 3, 2021, 26 pages (with English translation).

PCT International Search Report and Written Opinion issued in International Application No. PCT/CN2020/115328 on Aug. 27, 2020, 17 pages (with English translation).

Qualcomm Incorporated et al., "Handling of S-NSSAI and PDU session ID during mobility between EPS and 5GS," 3GPP TSG-CT WG1 Meeting #108, C1-180696, Gothenburg, Sweden, Jan. 22-26, 2018, 12 pages.

Huawei et al., "Proposed corrections to 38.300 mainly on RRC_Inactive state," 3GPP TSG-RAN WG2#99, R2-1709833, Berlin, Germany, Aug. 21-25, 2017, 12 pages.

Huawei et al., "QoS Parameters," 3GPP TSG-RAN WG2 Meeting #98, R2-1704976, Hangzhou, China, May 15-19, 2017, 3 pages.

Office Action in Korean Appin. No. 10-2022-7013975, mailed on Sep. 23, 2024, 13 pages (with English translation).

* cited by examiner

COMMUNICATION METHOD AND APPARATUS

CROSS-REFERENCE TO RELATED APPLICATIONS

This application is a continuation of International Application No. PCT/CN2020/115328, filed on Sep. 15, 2020, which claims priority to Chinese Patent Application No. 201910919493.1, filed on Sep. 26, 2019. The disclosures of the aforementioned applications are hereby incorporated by reference in their entireties.

TECHNICAL FIELD

Embodiments of this application relate to the communication field, and in particular, to a communication method and apparatus.

BACKGROUND

Currently, in a manner of limiting an aggregate bit rate that can be provided for a terminal device in an existing communication system, a core network usually sends an aggregate maximum bit rate of the terminal device to a base station, to limit an aggregate bit rate that can be provided for all non-guaranteed bit rate quality of service (Non-GBR QoS) flows of the terminal device.

However, a rate limiting manner in a conventional technology cannot satisfy current 5G application scenarios.

SUMMARY

This application provides a communication method and apparatus, to provide a rate limiting manner that can be applied to a 5G scenario.

To achieve the foregoing objective, the following technical solutions are used in this application.

According to a first aspect, an embodiment of this application provides a communication method. The method is applied to a first network device, and the method includes: receiving, by the first network device, a first message from a second network device, where the first message includes network slice configuration information, the network slice configuration information is used to indicate a maximum data rate provided by each of n network slices for a terminal device, and n is an integer greater than or equal to 1; and sending, by the first network device, a second message to the second network device, where the second message is used to indicate that the first network device rejects configuration requirements of maximum data rates provided by m network slices for the terminal device, and m is an integer greater than or equal to 0 and less than or equal to n.

In the foregoing manner, a data rate enforcement problem of the terminal device in a network slice is resolved in a network environment supporting the network slice. To be specific, in this application, the network slice is set at a granularity of the terminal device, and the first network device performs processing on a maximum data rate of each terminal device in the network slice, to improve quality of service of the terminal device.

In a possible implementation, a step of sending, by the first network device, the second message to the second network device may include: If the first network device determines, based on a local available resource and/or a local policy, to reject the maximum data rates provided by the m network slices for the terminal device, sending, by the first network device, the second message to the second network device.

In the foregoing manner, the first network device can determine, based on the local available resource and/or the local policy, whether to accept the maximum data rates provided by the n network slices for the terminal device. In an example, the first network device may accept the maximum data rates provided by the n network slices for the terminal device. In another example, the first network device may accept a part of the maximum data rates, namely, maximum data rates provided by one or more network slices for the terminal device, and reject maximum data rates provided by other network slices than the one or more network slices for the terminal device. In still another example, the first network device may not accept a requirement of any network slice, that is, reject the maximum data rates provided by the n network slices for the terminal device.

In a possible implementation, the method may further include: sending, by the first network device, rejection information to the second network device, where the rejection information is used to indicate that a reason why the first network device rejects the m network slices is that the first network device does not support the maximum data rates provided by the m network slices for the terminal device.

In the foregoing manner, the first network device can notify the second network device that the reason why the m network slices are rejected is that the first network device does not support requirements of the m network slices, to exclude a reason caused by a network or the second network device, so that the second network device does not need to detect the reason caused by the second network device when learning that the first network device rejects the m network slices.

In a possible implementation, the method may further include: sending, by the first network device, recommendation information to the second network device, where the recommendation information is used to indicate a maximum data rate that is provided by at least one of the m network slices for the terminal device and that can be supported by the first network device.

In the foregoing manner, the first network device can recommend, to the second network device based on the available resource and/or the local policy, the actual maximum data rate that is provided by at least one of the m network slices for the terminal device and that can be accepted by the first network device.

In a possible implementation, the network slice configuration information includes at least one of the following: first indication information, used to indicate an aggregate bit rate provided by each of the n network slices for a non-guaranteed bit rate quality of service non-GBR QoS flow and/or a guaranteed bit rate quality of service GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In the foregoing manner, different data flows provided by the network slices for the terminal device can be limited, to provide a comprehensive rate limiting manner for different application scenarios, and further improve the quality of service of the terminal device.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

In the foregoing manner, application scenario diversity can be improved. To be specific, this application can be applied to a handover scenario, a UE context setup scenario, a UE context modification scenario, a bearer context setup scenario, a bearer context modification scenario, a secondary node addition scenario, a secondary node modification scenario, a PDU session resource setup scenario, an initial context setup scenario, and/or the like.

According to a second aspect, an embodiment of this application provides a communication method. The method may be applied to a second network device, and the method may include: sending, by the second network device, a first message to a first network device, where the first message includes network slice configuration information, the network slice configuration information is used to indicate a maximum data rate provided by each of n network slices for a terminal device, and n is an integer greater than or equal to 1; and receiving, by the second network device, a second message from the first network device, where the second message is used to indicate that the first network device rejects configuration requirements of maximum data rates provided by m network slices for the terminal device, and m is an integer greater than or equal to 0 and less than or equal to n.

In a possible implementation, the second message is sent to the second network device if the first network device determines, based on a local available resource and/or a local policy, to reject the maximum data rates provided by the m network slices for the terminal device.

In a possible implementation, the method further includes: receiving, by the second network device, rejection information sent by the first network device, where the rejection information is used to indicate that a reason why the first network device rejects the m network slices is that the first network device does not support the maximum data rates provided by the m network slices for the terminal device.

In a possible implementation, the method further includes: receiving, by the second network device, recommendation information sent by the first network device, where the recommendation information is used to indicate a maximum data rate that is provided by at least one of the m network slices for the terminal device and that can be supported by the first network device.

In a possible implementation, the method further includes: modifying, based on the recommendation information, the maximum data rate provided by the at least one network slice for the terminal device, and indicating, to the first network device, a modified maximum data rate provided by the at least one network slice for the terminal device.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

According to a third aspect, an embodiment of this application provides a communication method. The method may be applied to a first network device and includes: receiving, by the first network device, a first message from a second network device, where the first message includes network slice configuration information, the network slice configuration information is used to indicate a maximum data rate provided by each of n network slices for a terminal device, and n is an integer greater than or equal to 1; and performing, by the first network device, resource scheduling and/or admission control on the n network slices based on the network slice configuration information.

In a possible implementation, the performing resource scheduling and/or admission control on the n network slices based on the network slice configuration information includes: determining, based on a local available resource and/or a local policy, to support maximum data rates provided by m network slices for the terminal device, where m is an integer greater than or equal to 0 and less than or equal to n; and allocating corresponding resources to the m network slices based on the network slice configuration information.

In a possible implementation, the first message is a retrieve UE context response message. Before the receiving a first message from a second network device, the method may further include: sending a retrieve UE context request message to the second network device.

In a possible implementation, the first message is a downlink NAS transport message.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

According to a fourth aspect, an embodiment of this application provides a communication method. The method includes: after receiving a first message sent by a second network device, sending, by a first network device, a second message to a third network device, where the second message includes network slice configuration information, the network slice configuration information is used to indicate a maximum data rate provided by each of n network slices for a terminal device, and n is an integer greater than or equal to 1; receiving, by the first network device, a third message sent by the third network device, where the third message is used to indicate that the third network device rejects configuration requirements of maximum data rates provided by m network slices for the terminal device, and m is an integer greater than or equal to 0 and less than or equal to n; and sending, by the first network device, a fourth message to the second network device, where the fourth message is used to indicate that the third network device rejects the configuration requirements of the maximum data rates provided by the m network slices for the terminal device, and m is an integer greater than or equal to 0 and less than or equal to n.

In a possible implementation, the third message includes rejection information, or the third message and the fourth message include rejection information, where the rejection information is used to indicate that a reason why the third network device rejects the m network slices is that the first network device does not support the maximum data rates provided by the m network slices for the terminal device.

In a possible implementation, the third message includes recommendation information, or the third message and the fourth message include recommendation information, where the recommendation information is used to indicate a maximum data rate that is provided by at least one of the m network slices for the terminal device and that can be supported by the third network device.

In a possible implementation, the first message is a handover required message, and the second message is a handover request message.

According to a fifth aspect, an embodiment of this application provides a communication apparatus. The apparatus is used in a first network device, and the apparatus includes a memory and a processor, where the memory is coupled to the processor, and the memory stores program instructions. When the program instructions are run by the processor, the apparatus is enabled to perform the following steps: receiving a first message from a second network device, where the first message includes network slice configuration information, the network slice configuration information is used to indicate a maximum data rate provided by each of n network slices for a terminal device, and n is an integer greater than or equal to 1; and sending a second message to the second network device, where the second message is used to indicate that the first network device rejects configuration requirements of maximum data rates provided by m network slices for the terminal device, where m is an integer greater than or equal to 0 and less than or equal to n.

In a possible implementation, when the program instructions are run by the processor, the apparatus is enabled to perform the following step: if determining, based on a local available resource and/or a local policy, to reject the maximum data rates provided by the m network slices for the terminal device, sending the second message to the second network device.

In a possible implementation, when the program instructions are run by the processor, the apparatus is enabled to perform the following step: sending rejection information to the second network device, where the rejection information is used to indicate a reason why the first network device rejects the m network slices is that the first network device does not support the maximum data rates provided by the m network slices for the terminal device.

In a possible implementation, when the program instructions are run by the processor, the apparatus is enabled to perform the following step: sending recommendation information to the second network device, where the recommendation information is used to indicate a maximum data rate that is provided by at least one of the m network slices for the terminal device and that can be supported by the first network device.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

According to a sixth aspect, an embodiment of this application provides a communication apparatus. The apparatus is used in a second network device, and the apparatus includes a memory and a processor, where the memory is coupled to the processor, and the memory stores program instructions. When the program instructions are run by the processor, the apparatus is enabled to perform the following steps: sending a first message to a first network device, where the first message includes network slice configuration information, the network slice configuration information is used to indicate a maximum data rate provided by each of n network slices for a terminal device, and n is an integer greater than or equal to 1; and receiving a second message from the first network device, where the second message is used to indicate that the first network device rejects configuration requirements of maximum data rates provided by m network slices for the terminal device, where m is an integer greater than or equal to 0 and less than or equal to n.

In a possible implementation, the second message is sent to the second network device if the first network device determines, based on a local available resource and/or a local policy, to reject the maximum data rates provided by the m network slices for the terminal device.

In a possible implementation, when the program instructions are run by the processor, the apparatus is enabled to perform the following step: receiving rejection information sent by the first network device, where the rejection information is used to indicate that a reason why the first network device rejects the m network slices is that the first network device does not support the maximum data rates provided by the m network slices for the terminal device.

In a possible implementation, when the program instructions are run by the processor, the apparatus is enabled to perform the following step: receiving recommendation information sent by the first network device, where the recommendation information is used to indicate a maximum data rate that is provided by at least one of the m network slices for the terminal device and that can be supported by the first network device.

In a possible implementation, when the program instructions are run by the processor, the apparatus is enabled to perform the following step: modifying, based on the recommendation information, the maximum data rate provided by the at least one network slice for the terminal device, and indicating, to the first network device, a modified maximum data rate provided by the at least one network slice for the terminal device.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

According to a seventh aspect, an embodiment of this application provides a communication apparatus. The apparatus is used in a first network device and includes a memory and a processor, where the memory is coupled to the processor, and the memory stores program instructions. When the program instructions are run by the processor, the apparatus is enabled to perform the following steps: receiving a first message from a second network device, where the first message includes network slice configuration information, the network slice configuration information is used to indicate a maximum data rate provided by each of n network slices for a terminal device, and n is an integer greater than or equal to 1; and performing resource scheduling and/or admission control on the n network slices based on the network slice configuration information.

In a possible implementation, when the program instructions are run by the processor, the apparatus is enabled to perform the following steps: determining, based on a local available resource and/or a local policy, to support maximum data rates provided by m network slices for the terminal device, where m is an integer greater than or equal to 0 and less than or equal to n; and allocating corresponding resources to the m network slices based on the network slice configuration information.

In a possible implementation, the first message is a retrieve UE context response message. Before receiving the first message from the second network device, the apparatus may further sends a retrieve UE context request message to the second network device.

In a possible implementation, the first message is a downlink NAS transport message.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

According to an eighth aspect, an embodiment of this application provides a communication apparatus. The apparatus is used in a first network device and includes a memory and a processor, where the memory is coupled to the processor, and the memory stores program instructions. When the program instructions are run by the processor, the apparatus is enabled to perform the following steps: after receiving a first message sent by a second network device, sending a second message to a third network device, where the second message includes network slice configuration information, the network slice configuration information is used to indicate a maximum data rate provided by each of n network slices for a terminal device, and n is an integer greater than or equal to 1; receiving a third message sent by the third network device, where the third message is used to indicate that the third network device rejects configuration requirements of maximum data rates provided by m network slices for the terminal device, and m is an integer greater than or equal to 0 and less than or equal to n; and sending a fourth message to the second network device, where the fourth message is used to indicate that the third network device rejects the configuration requirements of the maximum data rates provided by the m network slices for the terminal device, and m is an integer greater than or equal to 0 and less than or equal to n.

In a possible implementation, the third message includes rejection information, or the third message and the fourth message include rejection information, where the rejection information is used to indicate that a reason why the third network device rejects the m network slices is that the first network device does not support the maximum data rates provided by the m network slices for the terminal device.

In a possible implementation, the third message includes recommendation information, or the third message and the fourth message include recommendation information, where the recommendation information is used to indicate a maximum data rate that is provided by at least one of the m network slices for the terminal device and that can be supported by the third network device.

In a possible implementation, the first message is a handover required message, and the second message is a handover request message.

According to a ninth aspect, an embodiment of this application provides a communication apparatus. The apparatus is used in a first network device, and the apparatus includes:

a receiving module, configured to receive a first message from a second network device, where the first message includes network slice configuration information, the network slice configuration information is used to indicate a maximum data rate provided by each of n network slices for a terminal device, and n is an integer greater than or equal to 1; and a sending module, configured to send a second message to the second network device, where the second message is used to indicate that the first network device rejects configuration requirements of maximum data rates provided by m network slices for the terminal device, and m is an integer greater than or equal to 0 and less than or equal to n.

In a possible implementation, the sending module is configured to: if determining, based on a local available resource and/or a local policy, to reject the maximum data rates provided by the m network slices for the terminal device, send the second message to the second network device.

In a possible implementation, the sending module is further configured to: send rejection information to the second network device, where the rejection information is used to indicate that a reason why the first network device rejects the m network slices is that the first network device does not support the maximum data rates provided by the m network slices for the terminal device.

In a possible implementation, the sending module is further configured to: send recommendation information to the second network device, where the recommendation information is used to indicate a maximum data rate that is provided by at least one of the m network slices for the terminal device and that can be supported by the first network device.

In a possible implementation, the network slice configuration information includes at least one of the following: first indication information, used to indicate an aggregate bit rate provided by each of the n network slices for a non-guaranteed bit rate quality of service non-GBR QoS flow and/or a guaranteed bit rate quality of service GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

According to a tenth aspect, an embodiment of this application provides a communication apparatus. The apparatus is used in a second network device, and the apparatus includes:
- a sending module, configured to send a first message to a first network device, where the first message includes network slice configuration information, the network slice configuration information is used to indicate a maximum data rate provided by each of n network slices for a terminal device, and n is an integer greater than or equal to 1; and
- a receiving module, configured to receive a second message from the first network device, where the second message is used to indicate that the first network device rejects configuration requirements of maximum data rates provided by m network slices for the terminal device, and m is an integer greater than or equal to 0 and less than or equal to n.

In a possible implementation, the second message is sent to the second network device if the first network device determines, based on a local available resource and/or a local policy, to reject the maximum data rates provided by the m network slices for the terminal device.

In a possible implementation, the receiving module is further configured to: receive rejection information sent by the first network device, where the rejection information is used to indicate that a reason why the first network device rejects the m network slices is that the first network device does not support the maximum data rates provided by the m network slices for the terminal device.

In a possible implementation, the receiving module is further configured to: receive recommendation information sent by the first network device, where the recommendation information is used to indicate a maximum data rate that is provided by at least one of the m network slices for the terminal device and that can be supported by the first network device.

In a possible implementation, the apparatus further includes a modification module, configured to: modify, based on the recommendation information, the maximum data rate provided by the at least one network slice for the terminal device, and indicate, to the first network device, a modified maximum data rate provided by the at least one network slice for the terminal device.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

In a possible implementation, the first message is a handover request message; the first message is a UE context setup request message or a UE context modification request message; the first message is a bearer context setup request message or a bearer context modification request message; the first message is a secondary node addition request message or a secondary node modification request message; or the first message is a PDU session resource setup request message or an initial context setup request message.

According to an eleventh aspect, an embodiment of this application provides a communication apparatus. The apparatus is used in a first network device, and the apparatus includes:
- a receiving module, configured to receive a first message from a second network device, where the first message includes network slice configuration information, the network slice configuration information is used to indicate a maximum data rate provided by each of n network slices for a terminal device, and n is an integer greater than or equal to 1; and
- a processing module, configured to perform resource scheduling and/or admission control on the n network slices based on the network slice configuration information.

In a possible implementation, the processing module is configured to: determine, based on a local available resource and/or a local policy, to support maximum data rates provided by m network slices for the terminal device, where m is an integer greater than or equal to 0 and less than or equal to n; and allocate corresponding resources to the m network slices based on the network slice configuration information.

In a possible implementation, the first message is a retrieve UE context response message. Before receiving the first message from the second network device, the apparatus may further sends a retrieve UE context request message to the second network device.

In a possible implementation, the first message is a downlink NAS transport message.

In a possible implementation, the network slice configuration information includes at least one of the following: first indication information, used to indicate an aggregate bit rate provided by each of the n network slices for a non-GBR QoS flow and/or a GBR QoS flow of the terminal device; second indication information, used to indicate an aggregate bit rate provided by each of the n network slices for an uplink data flow of the terminal device, where the uplink data flow is an uplink non-GBR QoS flow and/or an uplink GBR QoS flow; or third indication information, used to indicate an aggregate bit rate provided by each of the n network slices for a downlink data flow of the terminal device, where the downlink data flow is a downlink non-GBR QoS flow and/or a downlink GBR QoS flow.

According to a twelfth aspect, an embodiment of this application provides a communication apparatus. The apparatus is used in a first network device, and the apparatus includes:
  a receiving module, configured to receive a first message sent by a second network device; and
  a sending module, configured to: after the receiving module receives the first message, send a second message to a third network device, where the second message includes network slice configuration information, the network slice configuration information is used to indicate a maximum data rate provided by each of n network slices for a terminal device, and n is an integer greater than or equal to 1.

The receiving module is further configured to receive a third message sent by the third network device, where the third message is used to indicate that the third network device rejects configuration requirements of maximum data rates provided by m network slices for the terminal device, and m is an integer greater than or equal to 0 and less than or equal to n.

The sending module is further configured to: after the receiving module receives the third message, send a fourth message to the second network device, where the fourth message is used to indicate that the third network device rejects the configuration requirements of the maximum data rates provided by the m network slices for the terminal device, and m is an integer greater than or equal to 0 and less than or equal to n.

In a possible implementation, the third message includes rejection information, or the third message and the fourth message include rejection information, where the rejection information is used to indicate that a reason why the third network device rejects the m network slices is that the first network device does not support the maximum data rates provided by the m network slices for the terminal device.

In a possible implementation, the third message includes recommendation information, or the third message and the fourth message include recommendation information, where the recommendation information is used to indicate a maximum data rate that is provided by at least one of the m network slices for the terminal device and that can be supported by the third network device.

In a possible implementation, the first message is a handover required message, and the second message is a handover request message.

According to a thirteenth aspect, an embodiment of this application provides a computer-readable medium, configured to store a computer program. The computer program includes instructions used to perform the method according to any one of the first aspect or the possible implementations of the first aspect.

According to a fourteenth aspect, an embodiment of this application provides a computer-readable medium, configured to store a computer program. The computer program includes instructions used to perform the method according to any one of the second aspect or the possible implementations of the second aspect.

According to a fifteenth aspect, an embodiment of this application provides a computer-readable medium, configured to store a computer program. The computer program includes instructions used to perform the method according to any one of the third aspect or the possible implementations of the third aspect.

According to a sixteenth aspect, an embodiment of this application provides a computer-readable medium, configured to store a computer program. The computer program includes instructions used to perform the method according to any one of the fourth aspect or the possible implementations of the fourth aspect.

According to a seventeenth aspect, an embodiment of this application provides a computer program. The computer program includes instructions used to perform the method according to any one of the first aspect or the possible implementations of the first aspect.

According to an eighteenth aspect, an embodiment of this application provides a computer program. The computer program includes instructions used to perform the method according to any one of the second aspect or the possible implementations of the second aspect.

According to a nineteenth aspect, an embodiment of this application provides a computer program. The computer program includes instructions used to perform the method according to any one of the third aspect or the possible implementations of the third aspect.

According to a twentieth aspect, an embodiment of this application provides a computer program. The computer program includes instructions used to perform the method according to any one of the fourth aspect or the possible implementations of the fourth aspect.

According to a twenty-first aspect, an embodiment of this application provides a chip. The chip includes a processing circuit and a transceiver pin. The transceiver pin and the processing circuit communicate with each other through an internal connection path. A processor performs the method according to any one of the first aspect or the possible implementations of the first aspect, to control a receive pin to receive a signal, and control a transmit pin to send the signal.

According to a twenty-second aspect, an embodiment of this application provides a chip. The chip includes a processing circuit and a transceiver pin. The transceiver pin and the processing circuit communicate with each other through an internal connection path. A processor performs the method according to any one of the second aspect or the possible implementations of the second aspect, to control a receive pin to receive a signal, and control a transmit pin to send the signal.

According to a twenty-third aspect, an embodiment of this application provides a chip. The chip includes a processing circuit and a transceiver pin. The transceiver pin and the processing circuit communicate with each other through an internal connection path. A processor performs the method according to any one of the third aspect or the possible implementations of the third aspect, to control a receive pin to receive a signal, and control a transmit pin to send the signal.

According to a twenty-fourth aspect, an embodiment of this application provides a chip. The chip includes a processing circuit and a transceiver pin. The transceiver pin and the processing circuit communicate with each other through an internal connection path. A processor performs the method according to any one of the fourth aspect or the possible implementations of the fourth aspect, to control a receive pin to receive a signal, and control a transmit pin to send the signal.

According to a twenty-fifth aspect, an embodiment of this application provides a communication system. The system includes the first network device, the second network device, and the terminal device according to the first aspect, the second aspect, the third aspect, and the fourth aspect.

BRIEF DESCRIPTION OF DRAWINGS

To describe technical solutions in embodiments of this application more clearly, the following briefly describes the accompanying drawings for describing the embodiments of this application. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1A:
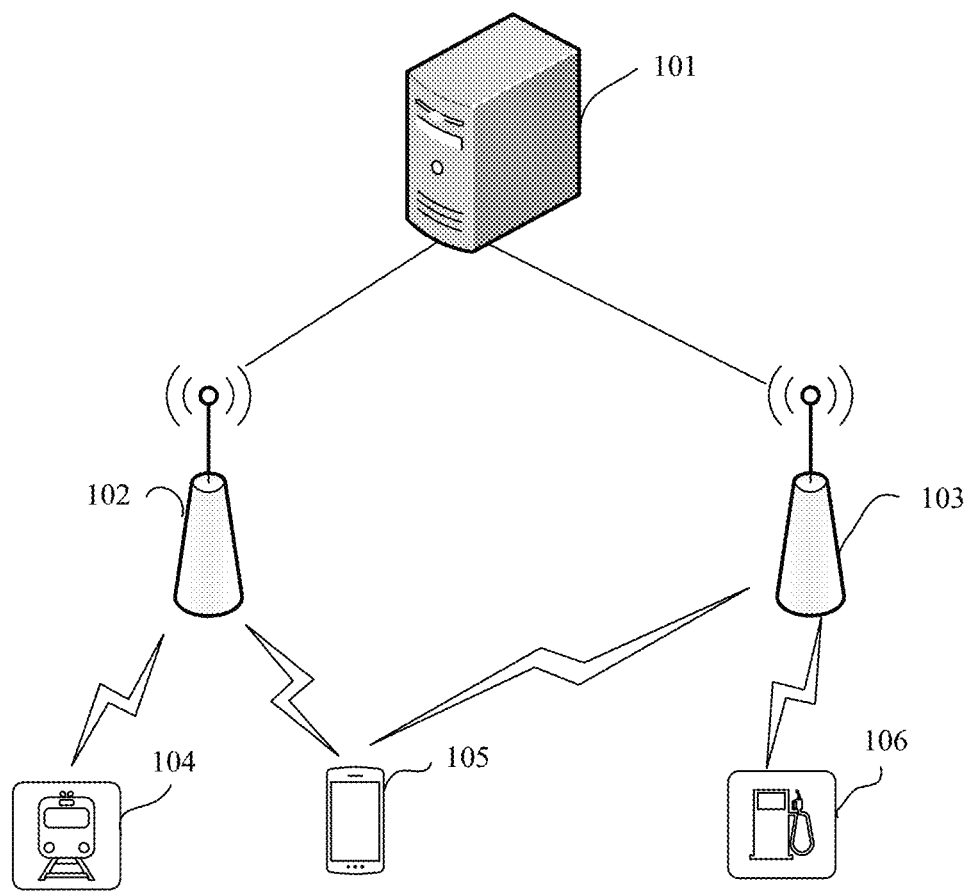
FIG. 1A is a schematic diagram of a possible architecture of a communication system according to an embodiment of this application.

The following clearly and describes technical solutions in embodiments of this application with reference to the accompanying drawings in the embodiments of this application. It is clear that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are intended to distinguish different target objects, but do not indicate a specific order of the target objects.

In addition, in the embodiments of this application, the word "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the word such as "example" or "for example" is intended to present a related concept in a specific manner.

In the descriptions of the embodiments of this application, unless otherwise stated, "a plurality of" means two or more than two. For example, a plurality of processing units refer to two or more processing units; and a plurality of systems refer to two or more systems.

Next, descriptions of network elements and technical terms that may be related to the embodiments of this application are as follows:

A terminal device may be user equipment (UE), and the UE accesses a network side through a base station. For example, the UE may be a handheld terminal device, a notebook computer, a user unit (subscriber unit), a cellular phone, a smart phone, a wireless data card, a personal digital assistant (PDA) computer, a tablet computer, a wireless modem, a handheld device, a laptop computer, a cordless phone, a wireless local loop (WLL), a machine type communication (MTC) terminal, or other devices that can access the network.

A base station is mainly responsible for functions such as radio resource management, quality of service (QoS) management, and data compression and encryption on an air interface side.

A core network device may be an access and mobility management function (AMF), and is mainly responsible for functions such as access control, mobility management (MM), attachment and detachment, and gateway selection.

The core network device in the embodiments of this application is not limited to the AMF.

A concept of a network slice is introduced into a 5th generation (5G) communication system, and in a network slicing technology, one physical network can be divided into a plurality of virtual networks. One virtual network is considered as one "network slice", and network slices are independent of each other. Different protocol data unit (PDU) sessions in one terminal device may need a network slice corresponding to each PDU session to provide a service.

To make a person skilled in the art better understand this application, the following briefly describes the concept of the network slice in this application.

As a key technology in 5G, the network slice has been widely concerned and researched in 3GPP and other international standards organizations, and can satisfy customization requirements of operators on various industries, vertical markets, and virtual operation services. The network slice is a logical network that provides specific network capabilities and network characteristics (Network Slice: A logical network that provides specific network capabilities and network characteristics). The network slice may be a logical network having different network capabilities and network characteristics, and the logical network is on a physical or virtual network infrastructure and is customized based on different service requirements, tenants, or the like. The network slice includes a group of network capabilities and resources (for example, a computing resource, a storage resource, and a network resource) required for the network capabilities.

A network slice supported by each cell is configured by an operation, administration and maintenance (OAM) system. One piece of single network slice selection assistance information (S-NSSAI) identifies one network slice.

The S-NSSAI includes at least one of the following: slice type and service type (slice/service type, SST) information. Optionally, the S-NSSAI may further include slice differentiator (SD) information. The SST information is used to indicate behavior of the network slice, for example, a characteristic and a service type of the network slice, and the SD information is supplementary information of the SST. For example, if the SST points to a plurality of network slices, the SD may assist in corresponding to one unique network slice.

There are a plurality of types of services in the terminal device, for example, an enhanced mobile broadband (eMBB) service, ultra-reliable low-latency communication (URLLC), and massive machine type communication (mMTC). PDU sessions of different types of services may correspond to different network slices.

For example, the UE includes three PDU sessions, and each PDU session may correspond to one network slice. A plurality of PDU sessions may correspond to a same network slice. Because provided operators or service providers are different, even PDU sessions of a same service type may also correspond to different network slices. In other words, the network slice may provide a network resource for at least one PDU session of the terminal device.

Before the technical solutions in the embodiments of this application are described, a communication system in the embodiments of this application is first described with reference to the accompanying drawings. FIG. 1A is a schematic diagram of a communication system according to an embodiment of this application. The communication system includes a core network device 101, base stations (including a base station 102 and a base station 103), and terminal devices (including a terminal device 104, a terminal device 105, and a terminal device 106). It should be noted that, in actual application, there may be one or more base stations and terminal devices. Quantities of base stations and terminal devices in the communication system shown in FIG. 1A are merely adaptive examples. This is not limited in this application.

As shown in FIG. 1A, one terminal device may access at least one base station. For example, the terminal device 104 is connected to the base station 102, the terminal device 106 is connected to the base station 103, and the terminal device 105 is connected to the base station 102 and the base station 103 (where this scenario is referred to as dual connectivity). The base station may be connected to at least one core network device. For example, the base station 102 and the base station 103 are respectively connected to the core network device 101.

There is a communication interface between the core network device 101 and the base station 102 and a communication interface between the core network device 101 and the base station 103. In this way, the core network device 101 can communicate with the base station 102 and the base station 103. For example, the communication interface is referred to as an N2 interface or an NG interface in this application.

If there is a communication interface between the base station 102 and the base station 103, the base station 102 and the base station 103 can directly communicate with each other. Direct communication herein means that the two base stations may not need to communicate with each other through the core network device or another device. For example, the communication interface between the base station 102 and the base station 103 may be referred to as an Xn interface.

If there is no communication interface between the base station 102 and the base station 103, the base station 102 and the base station 103 cannot directly communicate with each other. In a possible manner, the two base stations having no communication interface may communicate with each other through the core network device.

The communication system may be used to support a fourth generation (4G) access technology, for example, a long term evolution (LTE) access technology. Alternatively, the communication system may support a fifth generation (5G) access technology, for example, a new radio (NR) access technology. Alternatively, the communication system may be used to support a third generation (3G) access technology, for example, a universal mobile telecommunications system (UMTS) access technology. Alternatively, the communication system may be used to support a second generation (2G) access technology, for example, a global system for mobile communications (GSM) access technology. Alternatively, the communication system may be used in a communication system that supports a plurality of wireless technologies, for example, an LTE technology and an NR technology. In addition, the communication system is also applicable to a narrowband-internet of things (NB-IoT) system, an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and a future-oriented communication system.

It should be noted that the base station (for example, a first base station, a second base station, a source base station, or a target base station) in the embodiments of this application may be a next generation NodeB (gNB) or a next generation-evolved NodeB (ng-eNB). The gNB provides a user plane function and a control plane function of new radio (NR) for UE, and the ng-eNB provides a user plane function and a control plane function of evolved universal terrestrial radio access (E-UTRA) for the UE. It should be noted that, the gNB and the ng-eNB are merely names, are used to indicate base stations that support a 5G network system, and are not intended for limitation. Alternatively, the base station in the embodiments may be a base transceiver station (BTS) in a GSM system or a CDMA system, may be a NodeB (NB) in a WCDMA system, or may be an evolved NodeB (eNB, or eNodeB) in an LTE system. Alternatively, the base station in the embodiments may be a relay station, an access point, a vehicle-mounted device, a wearable device, a network side device in a network after 5G, a network device in a future evolved PLMN network, a road site unit (RSU), or the like.

Figure 2:
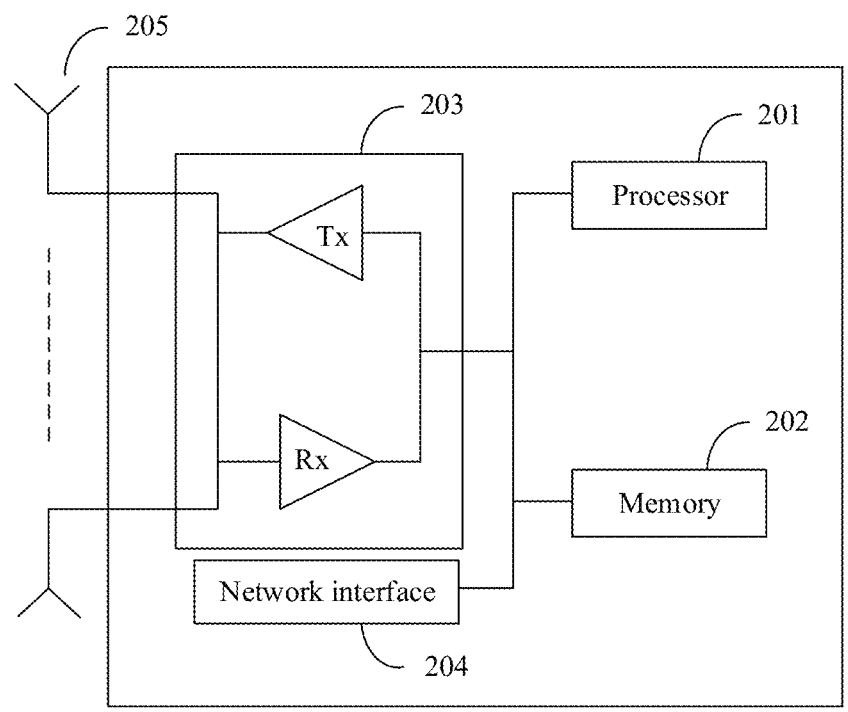
FIG. 2 is a schematic diagram of a structure of a base station according to an embodiment of this application.

FIG. 2 is a schematic diagram of a structure of a base station. In FIG. 2:

The base station includes at least one processor 201, at least one memory 202, at least one transceiver 203, at least one network interface 204, and one or more antennas 205. The processor 201, the memory 202, the transceiver 203, and the network interface 204 are connected, for example, through a bus. The antenna 205 is connected to the transceiver 203. The network interface 204 is configured to enable the base station to be connected to another communication device through a communication link. In this embodiment of this application, the connection may include various interfaces, transmission lines, buses, or the like. This is not limited in this embodiment.

In this embodiment of this application, the processor, for example, the processor 201, may include at least one of the following types: a general-purpose central processing unit (CPU), a digital signal processor (DSP), a microprocessor, an application-specific integrated circuit (ASIC), a microcontroller (MCU), a field programmable gate array (PGA), or an integrated circuit configured to implement a logical operation. For example, the processor 201 may be a single-core (single-CPU) processor or a multi-core (multi-CPU) processor. The at least one processor 201 may be integrated into one chip or located on a plurality of different chips.

In this embodiment of this application, the memory, for example, the memory 202, may include at least one of the following types: a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 202 may exist independently, or may be connected to the processor 201. Optionally, the memory 202 may alternatively be integrated with the processor 201, for example, integrated into a chip. The memory 202 can store program code for performing the technical solutions in the embodiments of this application, and the processor 201 controls execution of the program code. Various types of executed computer program code may also be considered as drivers of the processor 201. For example, the processor 201 is configured to execute the computer program code stored in the memory 202, to implement the technical solutions in the embodiments of this application. Optionally, the memory 202 may be located outside a chip, and is connected to the processor 201 through an interface.

The transceiver 203 may be configured to support receiving or sending of a radio frequency signal between an access network device and a terminal device, and the transceiver 203 may be connected to the antenna 205. The transceiver 203 includes a transmitter Tx and a receiver Rx. Specifically, the one or more antennas 205 may receive a radio frequency signal. The receiver Rx of the transceiver 203 is configured to: receive the radio frequency signal from the antenna, convert the radio frequency signal into a digital baseband signal or a digital intermediate frequency signal, and provide the digital baseband signal or the digital intermediate frequency signal for the processor 201, so that the processor 201 further processes the digital baseband signal or the digital intermediate frequency signal, for example, performs demodulation processing and decoding processing. In addition, the transmitter Tx of the transceiver 203 is further configured to: receive a modulated digital baseband signal or digital intermediate frequency signal from the processor 201, convert the modulated digital baseband signal or digital intermediate frequency signal into a radio frequency signal, and send the radio frequency signal through the one or more antennas 205. Specifically, the receiver Rx may selectively perform one or more levels of down-mixing processing and analog-to-digital conversion processing on the radio frequency signal to obtain a digital baseband signal or a digital intermediate frequency signal, and a sequence of the down-mixing processing and the analog-to-digital conversion processing is adjustable. The transmitter Tx may selectively perform one or more levels of up-mixing processing and digital-to-analog conversion processing on the modulated digital baseband signal or digital intermediate frequency signal to obtain a radio frequency signal, and a sequence of the up-mixing processing and the digital-to-analog conversion processing is adjustable. The digital baseband signal and the digital intermediate frequency signal may be collectively referred to as a digital signal.

Figure 1B:
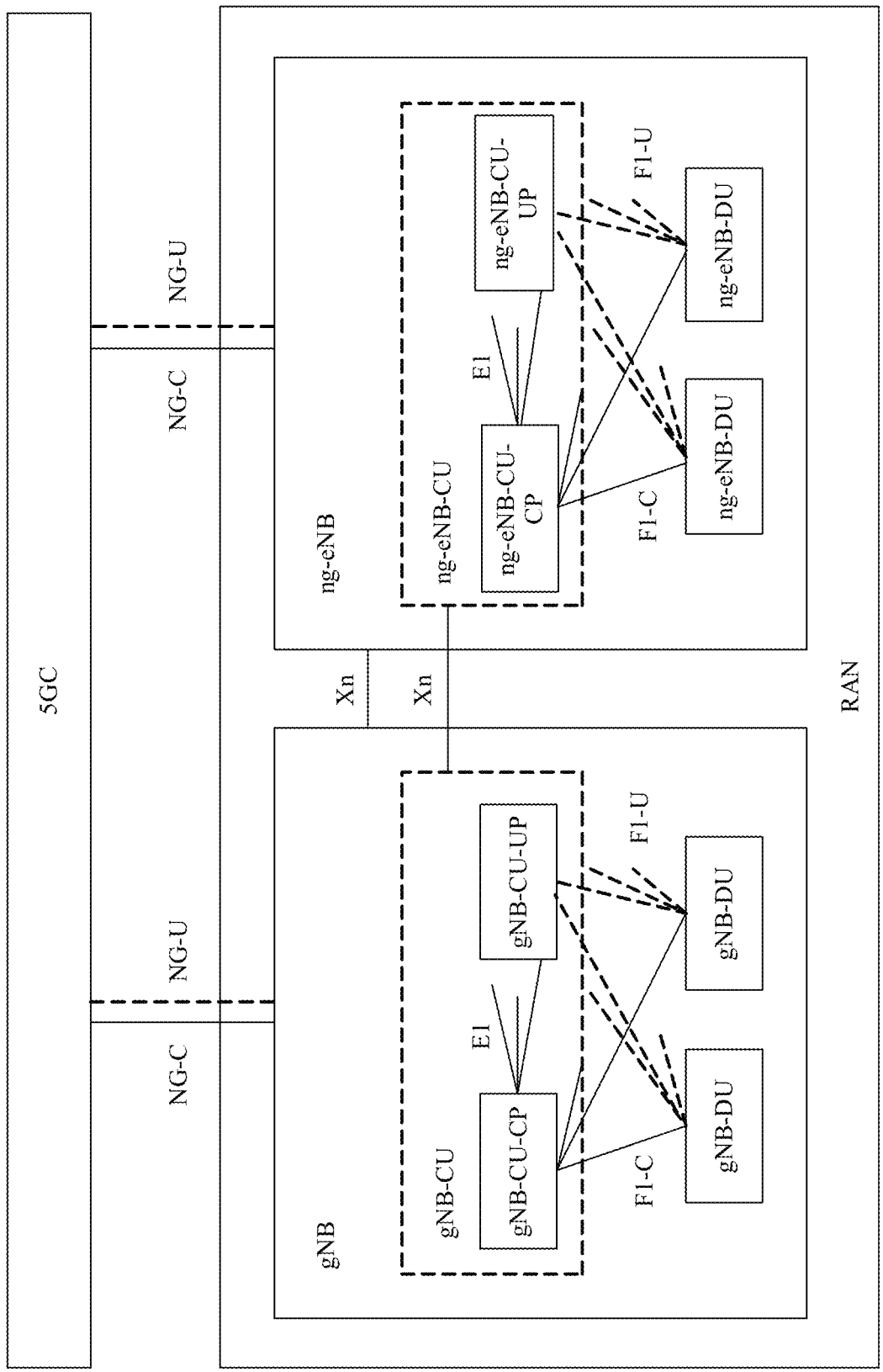
FIG. 1B is a schematic diagram of an architecture of a CU-DU split base station according to an embodiment of this application.

As shown in FIG. 1B, it should be noted that in a CU-DU split architecture, a base station includes two parts: a centralized unit (centralized unit, CU) and a distributed unit (DU). In a possible manner, a radio resource control (RRC) layer, a packet data convergence protocol (PDCP) layer, and a service data adaptation (SDAP) layer are deployed on the CU. A radio link layer control protocol (RLC) layer, a media access control (MAC) layer, and a physical layer (PHY) layer are deployed on the DU. Correspondingly, the CU is capable of processing the RRC, the PDCP, and the SDAP. The DU is capable of processing the RLC, the MAC, and the PHY. It should be noted that the foregoing function division is only an example, and there may be alternatively another division manner. For example, the CU is capable of processing the RRC, the PDCP, the RLC, and the SDAP, and the DU is capable of processing the MAC, and the PHY. For another example, the CU is capable of processing the RRC, the PDCP, the RLC, the SDAP, and a part of the MAC (for example, adding a MAC header), and the DU is capable of processing the PHY and a part of the MAC (for example, scheduling). Names of the CU and the DU may change, and any access network node that can implement the foregoing functions may be considered as the CU and the DU in this application. A CU-CP has a control plane function of the CU, for example, is capable of processing the RRC and a PDCP control plane. A CU-UP has a user plane function of the CU, for example, is capable of processing the SDAP and a PDCP user plane. The CU may be connected to the DU through an F1 interface, the CU-CP may be connected to the CU-UP through an E1 interface, the CU-CP may be connected to the DU through a control plane interface (F1-C) of the F1, and the CU-UP may be connected to the DU through a user plane interface (F1-U) of the F1. This is not limited in this application.

It should be further noted that steps performed by the base station (for example, a first base station, a second base station, a source base station, or a target base station) in the embodiments of this application may be performed by the base station, the CU, or the CU-CP. This is not limited in this application.

A specific implementation solution of this application is described below with reference to the schematic diagram of the application scenario shown in FIG. 1A.

Specifically, in this application, a second network device may send a first message to a first network device, where the first message may include network slice configuration information, the configuration information is used to indicate a maximum data rate provided by each of n network slices for user equipment UE, and n is an integer greater than or equal to 1. After receiving the first message, the first network device determines whether to accept the maximum data rates provided by the n network slices for the terminal device, and returns a result to the second network device. Specifically, the first network device sends a second message to the second network device, where the second message may be used to indicate that the first network device rejects configuration requirements of maximum data rates provided by m network slices for the UE, and m is an integer greater than or equal to 0 and less than or equal to n.

Optionally, the first network device and the second network device may be base stations. In an example, the first network device may be a target base station, and the second network device may be a source base station. This application may be applied to a scenario in which the terminal device is handed over from the source base station to the target base station. For a specific embodiment, refer to a scenario 1. In another example, the second network device may be a master node (MN) in a dual connectivity scenario, and the first network device may be a secondary node (N). For a specific embodiment, refer to a scenario 2. In still another example, the second network device may be a CU in a base station, and the first network device may be a DU in the base station. For a specific embodiment, refer to a scenario 3. In still another example, the first network device may be a CU-UP, and the second network device may be a CU-CP. For a specific embodiment, refer to a scenario 4. In still another example, the second network device may be an AMF, and the first network device may be a base station. For a specific embodiment, refer to a scenario 5.

Scenario 1

Figure 3:
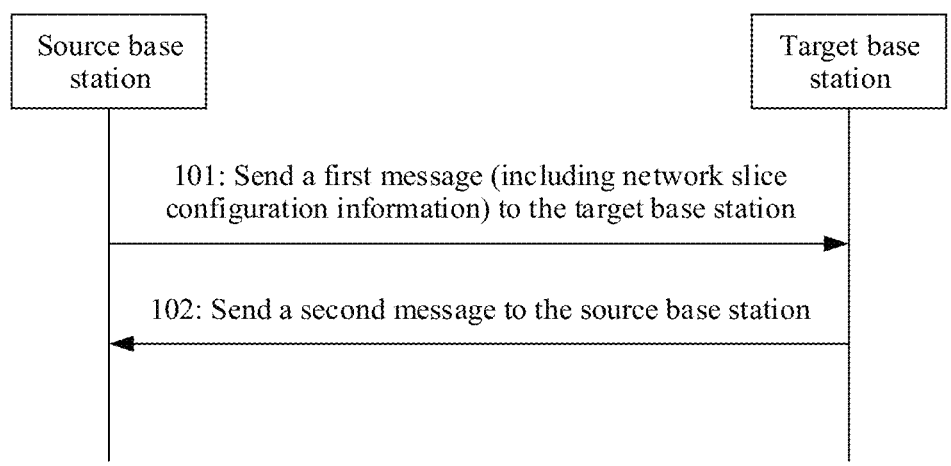
FIG. 3 is a first schematic flowchart of a communication method according to an embodiment of this application.

With reference to FIG. 1A, FIG. 3 is a schematic flowchart of a communication method according to an embodiment of this application. In FIG. 3:

Step 101: A source base station sends a first message to a target base station, where the first message includes network slice configuration information.

Specifically, in this application, the source base station may receive a measurement result of UE, and determine, based on the measurement result, that the UE needs to be handed over to the target base station. It should be noted that the solution described in this application relates only to a part related to rate limiting performed on a network slice. For other steps such as a measurement result obtaining step, a step of determining whether to perform a handover, and a subsequent handover step, refer to a conventional technology. This is not limited in this application.

Specifically, after determining that the UE needs to be handed over to the target base station, the source base station may send a handover request message to the target base station, where the message is used to indicate the target base station to prepare resources required for the UE to be handed over to the target base station. The handover request message may be the first message in this application.

Optionally, the handover request message may include the network slice configuration information, where the information is used to indicate a maximum data rate provided by each of n network slices for the UE.

Optionally, the maximum data rate includes at least one of the following:
 an aggregate maximum bit rate, used to limit an aggregate bit rate provided by the network slice for a non-guaranteed bit rate quality of service non-GBR QoS flow and/or a guaranteed bit rate quality of service (GBR QoS) flow of the UE;
 an uplink aggregate maximum bit rate, used to limit an aggregate bit rate provided by the network slice for an uplink data flow of the UE, where the uplink data flow is an uplink non-GBR QoS flow and/or an uplink GBR QoS flow; or
 a downlink aggregate maximum bit rate, used to limit an aggregate bit rate provided by the network slice for a downlink data flow of the UE, where the downlink data flow is a downlink non-GBR QoS flow and/or a downlink GBR QoS flow.

That is, for example, a sum of rates of specified data flows of the UE in the network slice may be a sum of data rates of the non-GBR QoS flow and the GBR QoS flow, and does not exceed a limited maximum data rate (namely, the maximum data rate provided by the network slice for the UE).

Optionally, the maximum data rate may be set by a core network device, or may be set by a control device. For a specific setting manner, refer to the conventional technology. Details are not described in this application. The control device herein may be an operation, administration and maintenance (OAM) system or a network management system. A naming manner of the control device is not limited in this application.

Optionally, the handover request message further includes identifier information of the UE, identifiers of k PDU sessions of the UE, and S-NSSAI of the n network slices corresponding to the k PDU sessions. It should be noted that the UE includes the k PDU sessions, where the k PDU sessions correspond to the n network slices, and each of the n network slices provides a maximum data rate for a corresponding PDU session. As described above, each of the k PDU sessions may correspond to one network slice, and a plurality of PDU sessions may correspond to a same network slice, where k is an integer greater than or equal to n.

Step 102: The target base station sends a second message to the source base station.

Specifically, after receiving the handover request message, the target base station may determine, based on a local available resource and/or a local policy, whether the target base station can support the maximum data rates provided by the n network slices for the UE.

Optionally, the local available resource may be a network resource, for example, currently available bandwidth, of the target base station. This is not limited in this application.

Optionally, the local policy includes but is not limited to at least one of the following: an access and mobility management related policy, an operator policy, an access network discovery and selection policy, a UE route selection policy, a session management related policy, or the like. For example, the operator policy may be a rate limiting policy of the current target base station.

The target base station may determine a quantity of acceptable network slices based on the local available resource, or based on the local policy, or based on the local available resource and the local policy.

In an example, the target base station may determine, based on the local available resource and/or the local policy, to accept the maximum data rates provided by the n network slices for the UE, and prepare the resources required for the handover of the UE. The target base station may send the second message to the source base station, where the second message is used to indicate that the target base station accepts the maximum data rates provided by the n network slices for the UE. Optionally, the second message is a handover request acknowledge message, where the message is used to indicate that the target base station has prepared the resources required for the handover, that is, the target base station accepts the maximum data rate provided by each of the n network slices for the UE.

In another example, the target base station may determine, based on the local available resource and/or the local policy, to reject maximum data rates provided by m (where m is greater than 0 and less than n) network slices for the UE, and the target base station has prepared the resources required for the handover. The target base station may send the second message to the source base station, where the second message is used to indicate that the target base station has prepared a part of the resources required for the handover, and indicate that the target base station rejects the maximum data rates provided by the m network slices for the UE. Optionally, the second message is a handover request acknowledge message. Optionally, the second message may further include rejection information used to indicate that a reason why each of the m network slices is rejected is that the target base station does not support the maximum data rates provided by the m network slices for the UE.

In still another example, the target base station may determine, based on the local available resource and/or the local policy, to reject the maximum data rates provided by the n network slices for the UE. The target base station may send the second message to the source base station, where the second message is used to indicate that a handover preparation fails, that is, the target base station rejects the UE to be handed over to the target base station, and indicate that the target base station rejects the maximum data rates provided by the n network slices for the UE. Optionally, the second message may be a handover preparation failure message. Optionally, the second message may further include rejection information used to indicate that a reason why the target base station rejects the UE to be handed over to the target base station is that the target base station does not support the maximum data rates provided by the n network slices for the UE.

In a possible implementation, the target base station may send recommendation information to the source base station, where the recommendation information is used to indicate a maximum data rate that is provided by at least one network slice for the UE and that can be supported by the target base station. The at least one network slice belongs to the rejected network slices. Optionally, the recommendation information may be carried in the second message, or the recommendation information may be carried in a newly defined message. This is not limited in this application.

In a possible implementation, the target base station may perform operations such as admission control and resource scheduling on an accepted network slice based on the network configuration information and the like, to ensure that an actual data rate of the UE in the network slice does not exceed a maximum data rate provided by the network slice for the UE.

It should be noted that in this application, "rejecting a network slice", "rejecting a requirement of a network slice", and "rejecting a maximum data rate provided by a network slice for the UE" have a same meaning, and all mean that a network device (for example, the target base station) rejects the maximum data rate provided by the network slice for at least one PDU session on the UE. Therefore, in this application, "a reason why a network slice is rejected is that the target base station does not support a maximum data rate provided by the network slice for the UE" may be: A reason why a PDU session is rejected is that the target base station does not support the maximum data rate provided by the network slice for the UE, and they both have a same meaning.

In a possible implementation, the rejection information may further include a plurality of rejection reasons, where the rejection reason is used to indicate that the reason why the PDU session is rejected is that the target base station does not support the maximum data rate provided by the network slice for the PDU session. Each rejected PDU session may correspond to one rejection reason. For specific details, refer to descriptions in the following embodiments.

Figure 4:
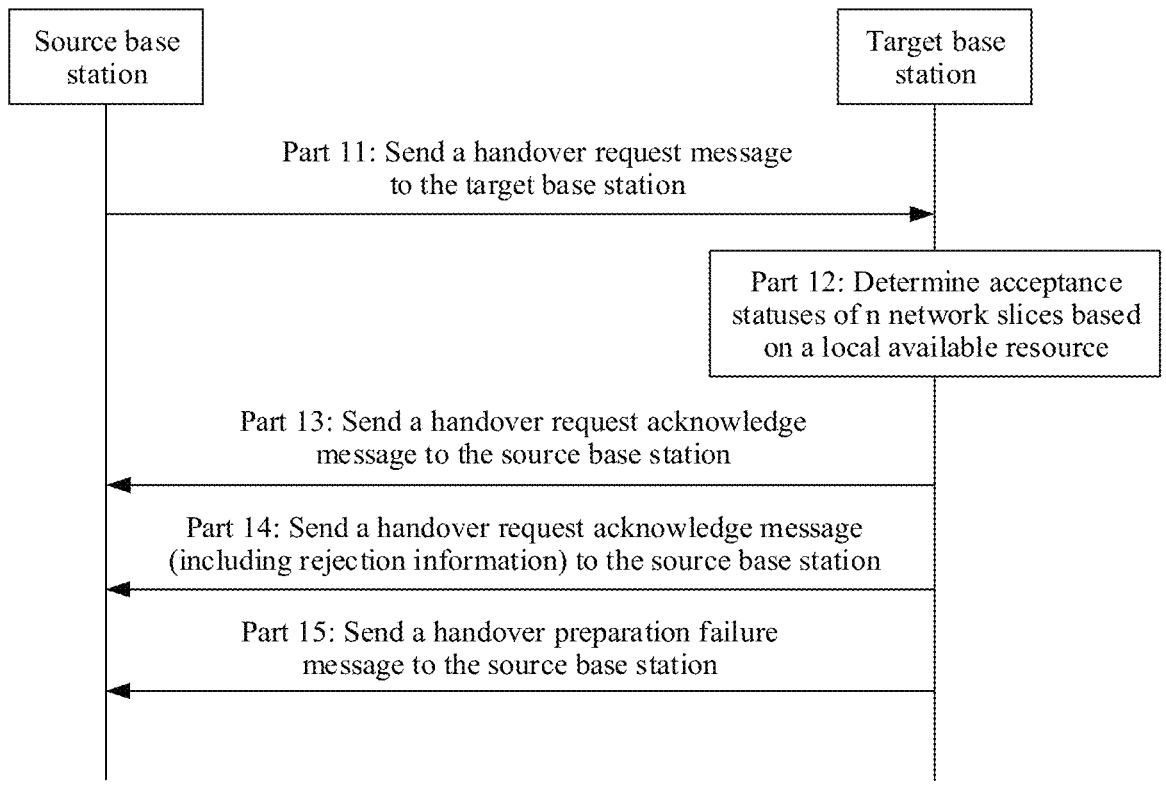
FIG. 4 is a first schematic flowchart of an example of a communication method.

Based on the embodiment shown in FIG. 3, FIG. 4 is a schematic flowchart of an example of a communication method. In FIG. 4:

Part 11: The source base station sends a handover request message to the target base station.

For example, the source base station is the base station 102 in FIG. 1A, the target base station is the base station 103, and UE is the terminal device 104. Specifically, the source base station determines that the UE needs to be handed over to the target base station, and sends the handover request message to the target base station. The handover request message includes but is not limited to: an identifier of the UE, identifiers of k PDU sessions of the UE, S-NSSAI of each of n network slices corresponding to the k PDU sessions, and maximum data rates provided by the n network slices for the corresponding PDU sessions. The maximum data rates provided by the n network slices for the corresponding PDU sessions may be understood as maximum data rates of the PDU sessions in the corresponding network slices, or may be understood as maximum data rates that are of the PDU sessions in the corresponding network slices and that are supported or allowed by the source base station.

For example, on the source base station, the UE includes four PDU sessions: a PDU session 1, a PDU session 2, a PDU session 3, and a PDU session 4. The PDU session 1 corresponds to a network slice 1, the PDU session 2 corresponds to a network slice 2, the PDU session 3 corresponds to a network slice 3, and the PDU session 4 corresponds to the network slice 3, that is, both the PDU session 3 and the PDU session 4 correspond to the network slice 3.

Optionally, a maximum data rate provided by each network slice for the UE is set on the source base station. For example, on the source base station, a maximum data rate provided by the network slice 1 for the PDU session 1 of the UE is 20 Mbps, a maximum data rate provided by the network slice 2 for the PDU session 2 is 15 Mbps, a maximum data rate provided by the network slice 3 for the PDU session 3 is 10 Mbps, and a maximum data rate provided by the network slice 3 for the PDU session 4 is 8 Mbps.

Optionally, the maximum data rate may be used to limit an aggregate bit rate provided by the network slice for a GBR QoS flow and a non-GBR QoS flow of the UE. For example, the PDU session 1 of the UE corresponds to the network slice 1, and the PDU session 1 includes three GBR QoS flows and three non-GBR QoS flows. The maximum data rate provided by the network slice 1 for the UE may be used to limit maximum data rates of the GBR QoS flows and the non-GBR QoS flows of the PDU session 1 in the network slice 1. That is, a sum of the data rates of the three GBR QoS flows and the three non-GBR QoS flows of the PDU session 1 cannot exceed the maximum data rate provided by the network slice 1 for the PDU session 1.

Part 12: The target base station determines acceptance statuses of the n network slices based on a local available resource.

Optionally, the target base station may determine, based on a sequence of the maximum data rates provided by the n network slices for the UE, whether to support a requirement of each network slice, where the requirement of the network slice is a resource required by the maximum data rate provided by the network slice for the UE. For example, the target base station sorts the requirements of the network slices in descending order. For example, the maximum data rate provided by the network slice 1 for the PDU session 1 is 20 Mbps, the maximum data rate provided by the network slice 2 for the PDU session 2 is 15 Mbps, the maximum data rate provided by the network slice 3 for the PDU session 3 is 10 Mbps, and the maximum data rate provided by the network slice 3 for the PDU session 4 is 8 Mbps. The target base station performs detection based on the available resource in sequence. For example, if a sum of data rates that can be currently provided by the target base station for the network slices is 40 Mbps, the target base station determines, based on the available resource, that a corresponding resource may be provided for the PDU session 1. This may also be understood as that the target base station may support a resource required by the maximum data rate provided by the network slice 1 for the PDU session 1, and correspondingly, a remaining available resource is 20 Mbps. Then, the target base station determines, based on the available resource (20 Mbps), that a corresponding resource (15 Mbps) may be provided for the PDU session 2, and a remaining available resource is 5 Mbps. In addition, if the target base station determines, based on the remaining network resource (5 Mbps), that the target base station cannot support a resource (10 Mbps) required for the maximum data rate provided by the network slice 3 for the PDU session 3, and the target base station further determines that the target base station cannot support a resource (8 Mbps) required by the maximum data rate provided by the network slice 3 for the PDU session 4 either, the target base station rejects a requirement of the network slice 3. This may also be understood as that the target base station rejects the PDU session 3 and the PDU session 4 that correspond to the network slice 3.

Optionally, the target base station may alternatively sort the requirements of the network slices based on factors such as importance of PDU session services of the UE, and perform determining one by one. A sequence of determining the requirements of the n network slices by the target base station may be set based on an actual requirement. This is not limited in this application.

In an example, the target base station may accept the requirements of the n network slices, and a part 13 is performed.

In another example, the target base station may reject requirements of m network slices, and a part 14 is performed, where m is greater than or equal to 0 and less than n.

In still another example, the target base station may reject the requirements of the n network slices, and a part 15 is performed.

For other specific details of determining whether to accept the requirements of the n network slices, refer to the foregoing embodiment. Details are not described herein again.

In this embodiment, an example in which the target base station determines the acceptance statuses of the n network slices based on the local available resource is used. A process in which the target base station determines the acceptance statuses of the n network slices based on the local available resource and the local policy, or the target base station determines the acceptance statuses of the n network slices based on the local policy is similar to that in this embodiment. Details are not described again.

Part 13: The target base station sends a handover request acknowledge message to the source base station.

Specifically, the target base station sends the handover request acknowledge message to the source base station, where the message is used to indicate that the target base station has prepared for a handover of the UE, and accepts the maximum data rates provided by the n network slices for the UE.

Part 14: The target base station sends a handover request acknowledge message to the source base station, where the message includes rejection information.

Specifically, when determining to reject maximum data rates provided by the m network slices for the UE, the target base station sends the handover request acknowledge message to the source base station, where the message is used to indicate that the target base station has prepared for a handover of the UE, and is further used to indicate that the target base station rejects the maximum data rates provided by the m network slices for the UE. That is, in this case, the UE may be handed over to the target base station, but at least one PDU session in the m network slices cannot be handed over to the target base station, and the target base station discards the at least one PDU session. Data in the part 12 is still used as an example for description. The target base station determines, based on the available resource (40 Mbps), that the corresponding resources may be provided for the PDU session 1 and the PDU session 2, and the remaining available resource is 5 Mbps. In addition, if the target base station determines, based on the remaining network resource (5 Mbps), that the target base station cannot support the resource required for the maximum data rate provided by the network slice 3 for the PDU session 3, and determines that the target base station cannot support the resource required by the maximum data rate provided by the network slice 3 for the PDU session 4, the target base station rejects the requirement of the network slice 3, that is, rejects the PDU session 3 and the PDU session 4 that correspond to the network slice 3. In other words, the target base station rejects one network slice (namely, the network slice 3), but actually rejects two PDU sessions (the PDU session 3 and the PDU session 4) in the network slice 3.

Optionally, the message carries the rejection information used to indicate that a reason why the target base station rejects the network slice 3 is that the target base station does not support the maximum data rate provided by the network slice 3 for the UE. For example, the rejection information includes a rejection reason 1 and a rejection reason 2. The rejection reason 1 is used to indicate that the reason why the target base station rejects the network slice 3 (which may be alternatively understood as that the target base station rejects the PDU session 3) is that the target base station does not support the maximum data rate provided by the network slice 3 for the UE. The rejection reason 2 is used to indicate that the reason why the target base station rejects the network slice 3 (which may be alternatively understood as that the target base station rejects the PDU session 4) is that the target base station does not support the maximum data rate provided by the network slice 3 for the UE.

Optionally, the handover request acknowledge message may further carry a maximum data rate that is provided by at least one of the m network slices (namely, the rejected network slices) for the UE and that can be supported by the target base station. The data in the part 12 is still used as an example for description. The target base station determines, based on the available resource (40 Mbps), the resources required by the maximum data rates that are provided by the network slice 1 and the network slice 2 for the PDU sessions on the UE, and the remaining available resource is 5 Mbps. In addition, if the target base station determines, based on the remaining network resource (5 Mbps), that the target base station cannot support the resources required by the maximum data rates provided by the network slice 3 for the PDU session 3 and the PDU session 4 on the UE, the target base station rejects the requirement of the network slice 3, and the target base station may recommend, to the source base station based on the remaining available network resource (5 Mbps), that the maximum data rates that are provided by the network slice 3 for the PDU session 3 and/or the PDU session 4 and that can be supported by the target base station are 5 Mbps (or less than 5 Mbps, and the data is only an example). Correspondingly, the source base station may determine, based on a recommended value, whether to update the maximum data rate provided by the network slice for the UE. A specific determining manner may be based on local settings of the source base station, a policy formulated by an AMF, or the like. This is not limited in this application. If the maximum data rate provided by the network slice for the UE may be updated based on the recommended value, the source base station sends an updated maximum data rate provided by the network slice for the UE to the target base station, and the target base station determines, based on the updated maximum data rate, to accept the maximum data rate provided by the network slice for the UE and accept the PDU session corresponding to the network slice.

Part 15: The target base station sends a handover preparation failure message to the source base station.

Specifically, the target base station determines to reject the maximum data rates provided by the n network slices for the UE, that is, determines not to accept a handover request of the UE. The target base station sends the handover preparation failure message to the source base station, where the message is used to indicate that the UE fails to be handed over, that is, the target base station does not prepare resources required for a handover of the UE.

Optionally, the handover preparation failure message may carry rejection information used to indicate that a reason why the target base station rejects the n network slices is that the target base station does not support the maximum data rates provided by the n network slices for the UE. In other words, a reason of a handover failure is that the target base station rejects the requirements of the n network slices, that is, the target base station cannot provide corresponding resources for the k PDU sessions.

Optionally, the handover preparation failure message may carry recommendation information used to indicate a maximum data rate that is provided by at least one of the n network slices for the UE and that can be supported by the target base station. For specific details, refer to the foregoing descriptions. Details are not described herein again.

Scenario 2

Figure 5:
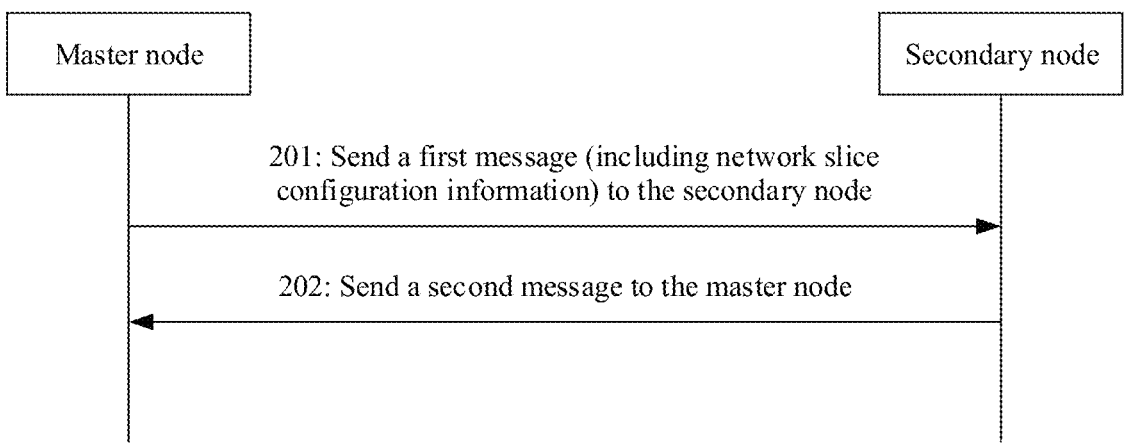
FIG. 5 is a second schematic flowchart of a communication method according to an embodiment of this application.

With reference to FIG. 1A, FIG. 5 is a schematic flowchart of a communication method according to an embodiment of this application. In FIG. 5:

Step 201: A master node sends a first message to a secondary node, where the first message includes network slice configuration information.

Specifically, the master node may provide a control plane connection to a core network for UE, and the secondary node may provide an additional resource (for example, a user plane connection between the UE and the core network) for the UE, but does not provide the control plane connection to the core network. That is, the master node and the secondary node correspond to a same network slice, and a sum of a resource of the network slice on the master node and a resource of the network slice on the secondary node is equal to a resource allocated by the core network to the network slice. For example, the core network sets a maximum data rate provided by a network slice 1 for the UE to 20 Mbps. In this case, the master node may set a maximum data rate of the UE in the network slice 1 to 15 Mbps, and the secondary node may set a maximum data rate of the UE in the network slice 1 to 5 Mbps. That is, a sum of maximum data rates of the UE in the network slices of the master node and the secondary node is less than or equal to a maximum data rate set by the core network for the UE.

Optionally, in this application, the master node may add or modify a maximum data rate of the UE in at least one network slice of the secondary node.

In an example, the master node may send an SN addition request (S-Node addition request, SeNB addition request, or SgNB addition request) message (where the SN addition request message may be the first message in this application) to the secondary node, where the message may include the network slice configuration information used to indicate a maximum data rate provided by each of n network slices for the UE. It should be noted that a request may be sent in a dual connectivity establishment process, that is, the message is used to indicate the secondary node to prepare resources required for a dual-link operation of the UE. In other words, the master node indicates the secondary node to perform processing such as admission and scheduling on the n network slices based on the network slice configuration information.

In another example, the master node may send an SN modification request (S-Node modification request, SeNB modification request, or SgNB modification request) message (where the SN modification request message may be the first message in this application) to the secondary node, where the message may include the network slice configuration information used to indicate a maximum data rate provided by each of n network slices for the UE. A request may be used to indicate the secondary node to modify, based on the network slice configuration information, the maximum data rates provided by the n network slices for the UE.

For other details, refer to the scenario 1. Details are not described herein.

Step 202: The secondary node sends a second message to the master node.

Specifically, after receiving the first message, the secondary node may determine, based on a local available resource and/or a local policy, whether the secondary node can support the maximum data rates provided by the n network slices for the UE.

In an example, the secondary node may determine, based on the local available resource and/or the local policy, to accept the maximum data rates provided by the n network slices for the UE. The secondary node may send the second message to the master node, where the second message is used to indicate that the secondary node accepts the maximum data rates provided by the n network slices for the UE. Optionally, if the first message is the SN addition request message, the second message may be an SN addition request acknowledge (S-Node addition request acknowledge, SeNB addition request acknowledge, or SgNB addition request acknowledge) message (where the message is the second message in this embodiment). Optionally, if the first message is the SN modification request message, the second message may be an SN modification request acknowledge (S-Node modification request acknowledge, SeNB modification request acknowledge, or SgNB modification request acknowledge) message (where the message is the second message in this embodiment), where the SN modification request acknowledge message is used to indicate that the secondary node accepts the maximum data rates provided by the n network slices for the UE, and the resource of the secondary node has been modified.

In another example, the secondary node may determine, based on the local available resource and/or the local policy, to reject maximum data rates provided by m (where m is greater than 0 and less than n) network slices for the UE. The secondary node may send the second message to the master node, where the second message is used to indicate that the secondary node rejects the maximum data rates provided by the m network slices for the UE. Optionally, if the first message is the SN addition request message, the second message may be an SN addition request acknowledge message. Optionally, if the first message is the SN modification request message, the second message may be an SN modification request acknowledge message.

In still another example, the secondary node may determine, based on the local available resource and/or the local policy, to reject the maximum data rates provided by the n network slices for the UE. The secondary node may send the second message to the master node, where the second message is used to indicate that the secondary node rejects the maximum data rates provided by the n network slices for the UE. Optionally, if the first message is the SN addition request message, the second message may be an SN addition request reject (S-Node addition request reject, SeNB addition request reject, or SgNB addition request reject) message. Optionally, if the first message is the SN modification request message, the second message may be an SN modification request reject (S-Node modification request reject, SeNB modification request reject, or SgNB modification request reject) message (where the message is the second message in this embodiment).

Optionally, the second message may further include rejection information used to indicate a reason why the secondary node fails to add or modify the resources for the UE, namely, a reason why the m network slices or the n network slices are rejected, is that the secondary node does not support the maximum data rates provided by the m network slices or the n network slices for the UE.

In a possible implementation, the second message may further include recommendation information used to indicate a maximum data rate that is provided by at least one network slice for the UE and that can be supported by the secondary node. The at least one network slice belongs to the rejected network slices. Specific details are described in the following embodiments.

In a possible implementation, the secondary node may perform operations such as admission control and resource scheduling on an accepted network slice based on the network configuration information and the like, to ensure that an actual data rate of the UE in the network slice does not exceed a maximum data rate provided by the network slice for the UE.

It should be noted that rejecting a network slice means rejecting a PDU session corresponding to the network slice. Therefore, in this application, "a reason why a network slice is rejected is that the secondary node does not support a maximum data rate provided by the network slice for the UE" may be: A reason why a PDU session is rejected is that the secondary node does not support the maximum data rate provided by the network slice for the UE, and they both have a same meaning.

Figure 6:
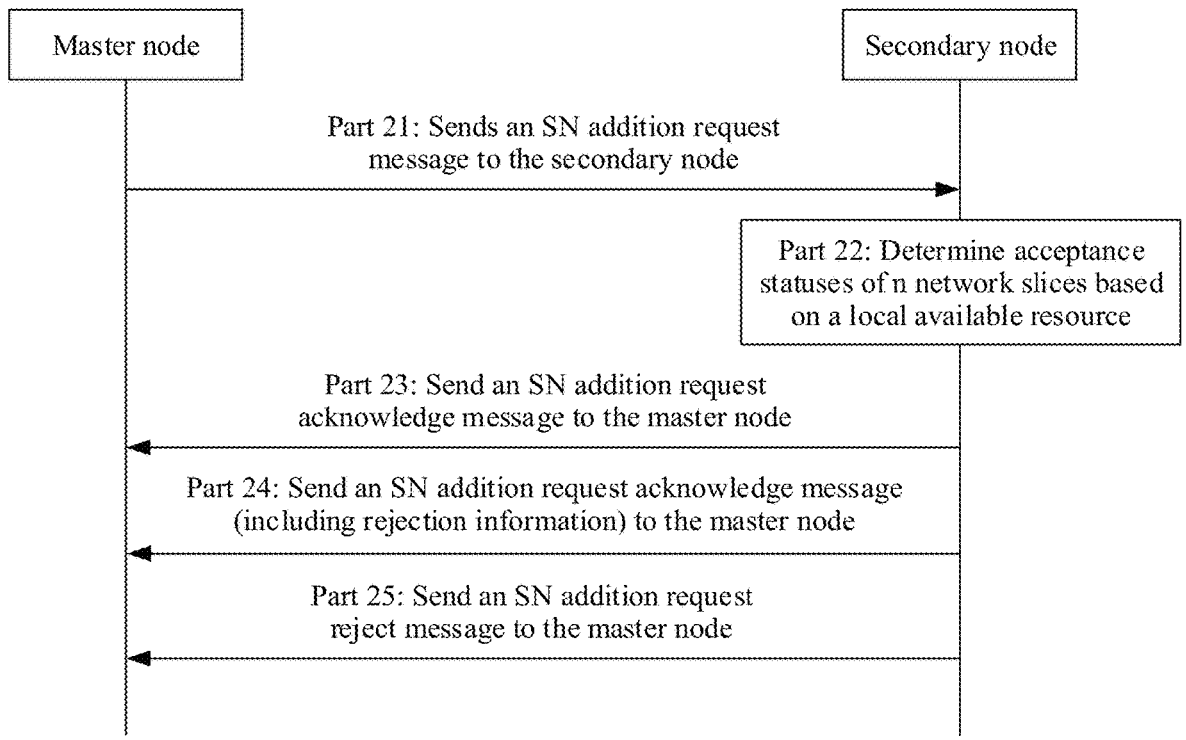
FIG. 6 is a second schematic flowchart of an example of a communication method.

Based on the embodiment shown in FIG. 5, FIG. 6 is a schematic flowchart of an example of a communication method. In FIG. 6:

Part 21: The master node sends an SN addition request message to the secondary node.

Specifically, the master node obtains a maximum data rate that is provided by each of n network slices for UE and that is set by a core network. For example, the settings are as follows: A maximum data rate provided by a network slice 1 for a PDU session 1 of the UE is 20 Mbps, a maximum data rate provided by a network slice 2 for a PDU session 2 is 15 Mbps, a maximum data rate provided by a network slice 3 for a PDU session 3 is 10 Mbps, and a maximum data rate provided by the network slice 3 for a PDU session 4 is 5 Mbps. The master node may set a maximum data rate of the UE in the network slice of the master node and a maximum data rate of the UE in the network slice of the secondary node based on the foregoing configurations. For example, the master node may set a maximum data rate of the PDU session 1 in the network slice 1 of the master node to 10 Mbps, set a maximum data rate of the PDU session 1 in the network slice 1 of the secondary node to 10 Mbps, set a maximum data rate of the PDU session 2 in the network slice 2 of the master node to 10 Mbps, set a maximum data rate of the PDU session 2 in the network slice 2 of the secondary node to 5 Mbps, set a maximum data rate of the PDU session 3 in the network slice 3 of the master node to 10 Mbps, and set a maximum data rate of the PDU session 4 in the network slice 3 of the secondary node to 5 Mbps.

The master node may send the SN addition request message to the secondary node, where the message includes but is not limited to at least one of the following: an identifier of the UE, identifiers of k PDU sessions that need to be added to the secondary node, S-NSSAI of the n network slices corresponding to the k PDU sessions, network slice configuration information, or the like. The network slice configuration information is used to indicate a maximum data rate provided by each of the n network slices for a corresponding PDU session. The message may be used to indicate the secondary node to add dual-link resources required for the k PDU sessions. In this embodiment, the master node may indicate, based on the configurations of the master node, the secondary node to add resources required for the PDU session 1 and the PDU session 2. For example, the network slice configuration information is used to indicate that the maximum data rate provided by the network slice 1 for the PDU session 1 is 10 Mbps, that is, the secondary node is expected to add a resource on the secondary node, to satisfy the maximum data rate provided by the network slice 1 for the PDU session 1.

Part 22: The secondary node determines acceptance statuses of the n network slices based on a local available resource.

Optionally, the secondary node may determine, based on the local available resource, whether to accept a dual connectivity request of a PDU session, that is, determine the acceptance statuses of then network slices. For specific details, refer to the scenario 1. Details are not described herein again.

In an example, the secondary node may accept requirements of then network slices, and a part 23 is performed.

In another example, the secondary node may reject requirements of m network slices, and a part 24 is performed, where m is greater than or equal to 0 and less than n.

In still another example, the secondary node may reject requirements of the n network slices, and a part 25 is performed.

Part 23: The secondary node sends an SN addition request acknowledge message to the master node.

Specifically, the secondary node sends the SN addition request acknowledge message to the master node, where the message is used to indicate that the secondary node has prepared resources for a dual-link operation of the PDU session 1, the PDU session 2, and the PDU session 4, that is, the secondary node accepts the maximum data rate provided by the network slice 1 for the PDU session 1, the maximum data rate provided by the network slice 2 for the PDU session 2, and the maximum data rate provided by the network slice 3 for the PDU session 4 that are indicated by the master node.

Part 24: The secondary node sends an SN addition request acknowledge message to the master node, where the message includes rejection information.

Specifically, the secondary node sends the SN addition request acknowledge message to the master node, where the message includes the rejection information used to indicate that a reason why the secondary node fails to add a resource for a PDU session is that the secondary node does not support a maximum data rate provided by a network slice corresponding to the PDU session for the UE. Optionally, the rejection information includes a plurality of rejection reasons, that is, each rejected PDU session corresponds to one rejection reason. For example, when the secondary node determines, based on the local available resource, to reject the maximum data rate provided by the network slice 2 for the PDU session 2 and to reject the maximum data rate provided by the network slice 3 for the PDU session 4, the secondary node sends the SN addition request acknowledge message to the master node, where the message is used to indicate that the secondary node has prepare resources for a dual-link operation of the UE, the secondary node rejects to add a resource (namely, the maximum data rate provided by the network slice 2 on the secondary node for the PDU session 2) corresponding to the maximum data rate (5 Mbps) required for the network slice 2, and the secondary node rejects to add a resource (namely, the maximum data rate provided by the network slice 3 on the secondary node for the PDU session 4) corresponding to the maximum data rate (5 Mbps) required for the network slice 3, that is, the secondary node cannot provide resources required for a dual connectivity operation of the PDU session 2 and the PDU session 4.

Part 25: The secondary node sends an SN addition request failure message to the master node.

Specifically, the secondary node sends the SN addition request failure message to the master node, where the message includes rejection information used to indicate that the secondary node fails to add the resources for the k PDU sessions, that is, the secondary node rejects the maximum data rates provided by the n network slices for the k PDUs.

A scenario in which the master node indicates the secondary node to modify a corresponding resource based on the network slice configuration information is similar to the foregoing steps, and details are not described again in this application.

Scenario 3

Figure 7:
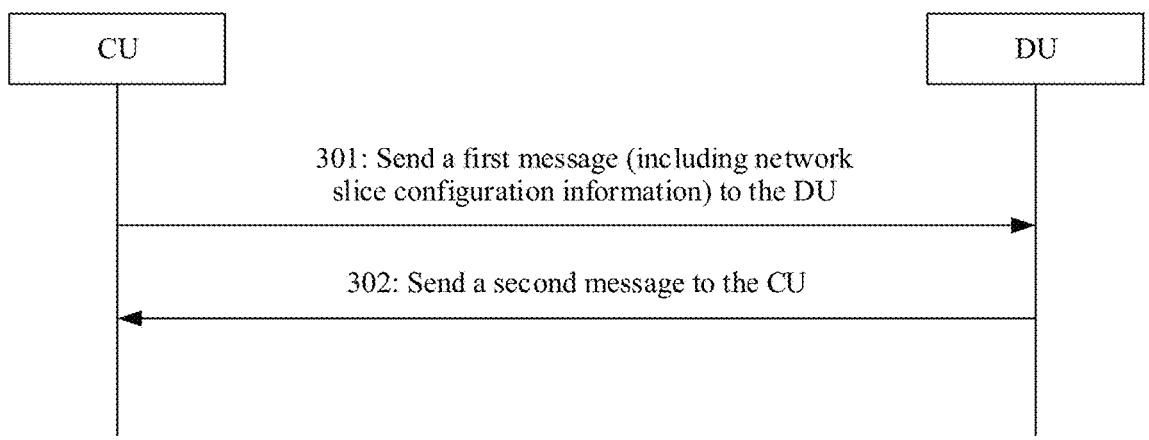
FIG. 7 is a third schematic flowchart of a communication method according to an embodiment of this application.

With reference to FIG. 1B, FIG. 7 is a schematic flowchart of a communication method according to an embodiment of this application. In FIG. 7:

Step 301: A CU sends a first message to a DU, where the first message includes network slice configuration information.

In an example, the first message may be a UE context setup request message used to request the DU to set a UE context.

In another example, the first message may be a UE context modification request message used to provide a change of UE context information for the DU.

Optionally, the first message includes the network slice configuration information used to indicate maximum data rates provided by n network slices for UE. For example, in this embodiment, the network slice configuration information may include a maximum data rate provided by each of the n network slices corresponding to k data resource bearers (DRBs) for the UE.

For other details, refer to the scenario 1 and the scenario 2. Details are not described herein.

Step 302: The DU sends a second message to the CU.

Specifically, after receiving the first message, the DU may determine, based on a local available resource and/or a local policy, whether the DU can support the maximum data rates provided by the n network slices for the UE.

In an example, the DU may determine, based on the local available resource and/or the local policy, to accept the maximum data rates provided by the n network slices for the UE. The DU may send the second message to the CU, where the second message is used to indicate that the DU accepts the maximum data rates provided by the n network slices for the UE. Optionally, if the first message is the UE context setup request message, the second message may be a UE context setup response message. Optionally, if the first message is the UE context modification request message, the second message may be a UE context modification response message.

In another example, the DU may determine, based on the local available resource and/or the local policy, to reject maximum data rates provided by m (where m is greater than 0 and less than n) network slices for the UE. The DU may send the second message to the CU, where the second message is used to indicate that the DU rejects the maximum data rates provided by the m network slices for the UE.

Optionally, if the first message is the UE context setup request message, the second message may be a UE context setup response message. Optionally, if the first message is the UE context modification request message, the second message may be a UE context modification response message.

In still another example, the DU may determine, based on the local available resource and/or the local policy, to reject the maximum data rates provided by the n network slices for the UE. The DU may send the second message to the CU, where the second message is used to indicate that the DU rejects the maximum data rates provided by the n network slices for the UE. Optionally, if the first message is the UE context setup request message, the second message may be a UE context setup failure message. Optionally, if the first message is the UE context modification request message, the second message may be a UE context modification failure message.

Optionally, the second message may further include rejection information used to indicate that a reason why the DU fails to set or modify DRBs, namely, a reason why the m network slices or the n network slices are rejected, is that the DU does not support the maximum data rates provided by the m network slices or the n network slices for the UE.

It should be noted that rejecting a network slice means rejecting a DRB corresponding to the network slice. Therefore, in this application, "a reason why a network slice is rejected is that the DU does not support a maximum data rate provided by the network slice for the UE" may be: A reason why a DRB is rejected is that the DU does not support the maximum data rate provided by the network slice for the UE, and they both have a same meaning.

In a possible implementation, the second message may further include recommendation information used to indicate a maximum data rate that is provided by at least one network slice for the UE and that can be supported by the DU. The at least one network slice belongs to the rejected network slices.

Scenario 4

Figure 8:
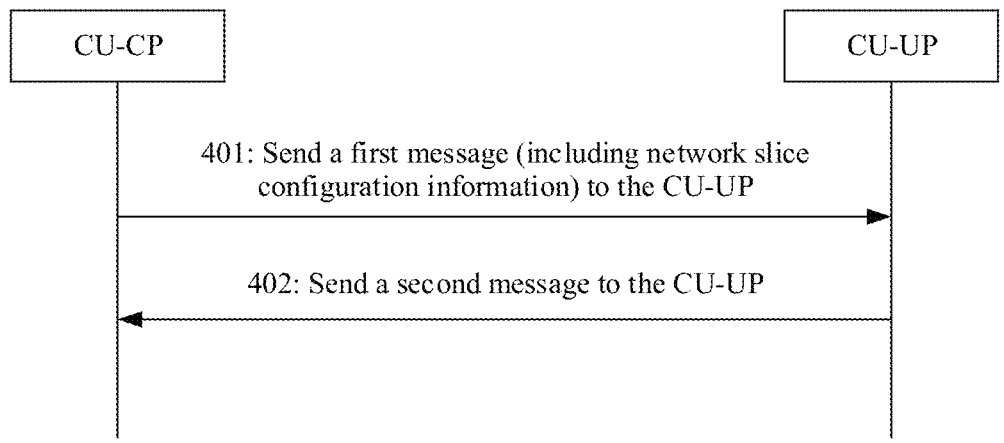
FIG. 8 is a fourth schematic flowchart of a communication method according to an embodiment of this application.

With reference to FIG. 1B, FIG. 8 is a schematic flowchart of a communication method according to an embodiment of this application. In FIG. 8:

Step 401: A CU-CP sends a first message to a CU-UP, where the first message includes network slice configuration information.

In an example, the first message may be a bearer context setup request message used to request the CU-UP to set a bearer context.

In another example, the first message may be a bearer context modification request message used to request the CU-UP to modify a bearer context.

Optionally, the first message includes the network slice configuration information used to indicate maximum data rates provided by n network slices for UE. For example, in this embodiment, the network slice configuration information may include a maximum data rate provided by each of the n network slices for a corresponding PDU session.

For other details, refer to the scenario 1, the scenario 2, and the scenario 3. Details are not described herein.

Step 402: The CU-UP sends a second message to the CU-CP.

Specifically, after receiving the first message, the CU-UP may determine, based on a local available resource and/or a local policy, whether the CU-UP can support the maximum data rates provided by the n network slices for the UE.

In an example, the CU-UP may determine, based on the local available resource and/or the local policy, to accept the maximum data rates provided by the n network slices for the UE. The CU-UP may send the second message to the CU-CP, where the second message is used to indicate that the CU-UP accepts the maximum data rates provided by the n network slices for the UE. Optionally, if the first message is the bearer context setup request message, the second message may be a bearer context setup response message. Optionally, if the first message is the bearer context modification request message, the second message may be a bearer context modification response message.

In another example, the CU-UP may determine, based on the local available resource and/or the local policy, to reject maximum data rates provided by m (where m is greater than 0 and less than n) network slices for the UE. The CU-UP may send the second message to the CU-CP, where the second message is used to indicate that the CU-UP rejects the maximum data rates provided by the m network slices for the UE. Optionally, if the first message is the bearer context setup request message, the second message may be a bearer context setup response message. Optionally, if the first message is the bearer context modification request message, the second message may be a bearer context modification response message.

In still another example, the CU-UP may determine, based on the local available resource and/or the local policy, to reject the maximum data rates provided by the n network slices for the UE. The CU-UP may send the second message to the CU-CP, where the second message is used to indicate that the CU-UP rejects the maximum data rates provided by the n network slices for the UE. Optionally, if the first message is the bearer context setup request message, the second message may be a bearer context setup failure message. Optionally, if the first message is the bearer context modification request message, the second message may be a bearer context modification failure message.

Optionally, the second message may further include rejection information used to indicate that a reason why the CU-UP fails to set or modify bearer contexts, namely, a reason why the m network slices or the n network slices are rejected, is that the CU-UP does not support the maximum data rates provided by the m network slices or the n network slices for the UE.

It should be noted that rejecting a network slice means rejecting a PDU session corresponding to the network slice. Therefore, in this application, "a reason why a network slice is rejected is that the CU-UP does not support a maximum data rate provided by the network slice for the UE" may be: A reason why a PDU session is rejected is that the CU-UP does not support the maximum data rate provided by the network slice for the UE, and they both have a same meaning.

In a possible implementation, the second message may further include recommendation information used to indicate a maximum data rate that is provided by at least one network slice for the UE and that can be supported by the CU-UP. The at least one network slice belongs to the rejected network slices.

Scenario 5

Figure 9:
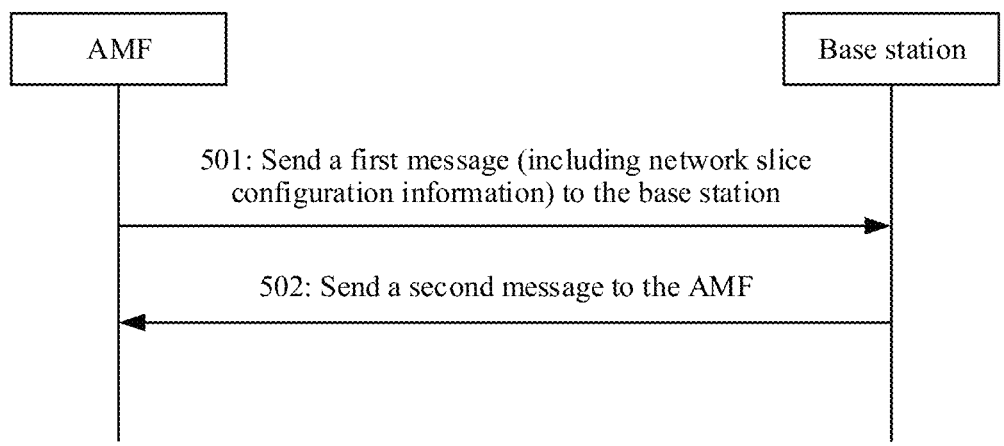
FIG. 9 is a fifth schematic flowchart of a communication method according to an embodiment of this application.

With reference to FIG. 1A, FIG. 9 is a schematic flowchart of a communication method according to an embodiment of this application. In FIG. 9:

Step 501: An AMF sends a first message to a base station, where the first message includes network slice configuration information.

In an example, the first message may be a PDU session resource setup request message used by the base station to allocate a resource to at least one PDU session.

In another example, the first message may be an initial context setup request message used to request to set a UE context.

In still another example, the first message may be a UE context modification request message used to provide a change of UE context information for the base station.

In still another example, the first message may be a downlink non-access stratum (NAS) transport (downlink NAS transport) message used to carry NAS information on an NG interface, so that the NAS information is sent to UE.

Optionally, the first message includes the network slice configuration information used to indicate maximum data rates provided by n network slices for the UE. For example, in this embodiment, the network slice configuration information may include a maximum data rate provided by each of the n network slices for a corresponding PDU session.

For other details, refer to the scenario 1, the scenario 2, the scenario 3, and the scenario 4. Details are not described herein.

Step 502: The base station sends a second message to the AMF.

Specifically, after receiving the first message, the base station may determine, based on a local available resource and/or a local policy, whether the base station can support the maximum data rates provided by the n network slices for the UE.

In an example, the base station may determine, based on the local available resource and/or the local policy, to accept the maximum data rates provided by the n network slices for the UE. The base station may send the second message to the AMF, where the second message is used to indicate that the base station accepts the maximum data rates provided by the n network slices for the UE. Optionally, if the first message is the PDU session resource setup request message, the second message may be a PDU session resource setup response message. Optionally, if the first message is the initial context setup request message, the second message may be an initial context setup response message. Optionally, if the first message is the UE context modification request, refer to the scenario 3. Details are not described herein.

In another example, the base station may determine, based on the local available resource and/or the local policy, to reject maximum data rates provided by m (where m is greater than 0 and less than n) network slices for the UE. The base station may send the second message to the AMF, where the second message is used to indicate that the base station rejects the maximum data rates provided by the m network slices for the UE. Optionally, if the first message is the PDU session resource setup request message, the second message may be a PDU session resource setup response message. Optionally, if the first message is the initial context setup request message, the second message may be an initial context setup response message. Optionally, if the first message is the UE context modification request, refer to the scenario 3. Details are not described herein.

In still another example, the base station may determine, based on the local available resource and/or the local policy, to reject the maximum data rates provided by the n network slices for the UE. The base station may send the second message to the AMF, where the second message is used to indicate that the base station rejects the maximum data rates provided by the n network slices for the UE. Optionally, if the first message is the PDU session resource setup request message, the second message may be a PDU session resource setup response message. Optionally, if the first message is the initial context setup request message, the second message may be an initial context setup failure message. Optionally, if the first message is the UE context modification request, refer to the scenario 3. Details are not described herein.

Optionally, the second message may further include rejection information used to indicate that a reason why the base station rejects the m network slices or the n network slices is that the base station does not support the maximum data rates provided by the m network slices or the n network slices for the UE.

Optionally, if the first message is the downlink NAS transport message, the base station may perform admission control and/or resource scheduling on a network slice based on acceptance statuses of the n network slices and the network slice configuration information, and does not need to send the second message to the AMF.

In a possible implementation, the second message may further include recommendation information used to indicate a maximum data rate that is provided by at least one network slice for the UE and that can be supported by the base station. The at least one network slice belongs to the rejected network slices.

It should be noted that rejecting a network slice means rejecting a PDU session corresponding to the network slice. Therefore, in this application, "a reason why a network slice is rejected is that the base station does not support a maximum data rate provided by the network slice for the UE" may be: A reason why a PDU session is rejected is that the base station does not support the maximum data rate provided by the network slice for the UE, and they both have a same meaning.

Figure 10:
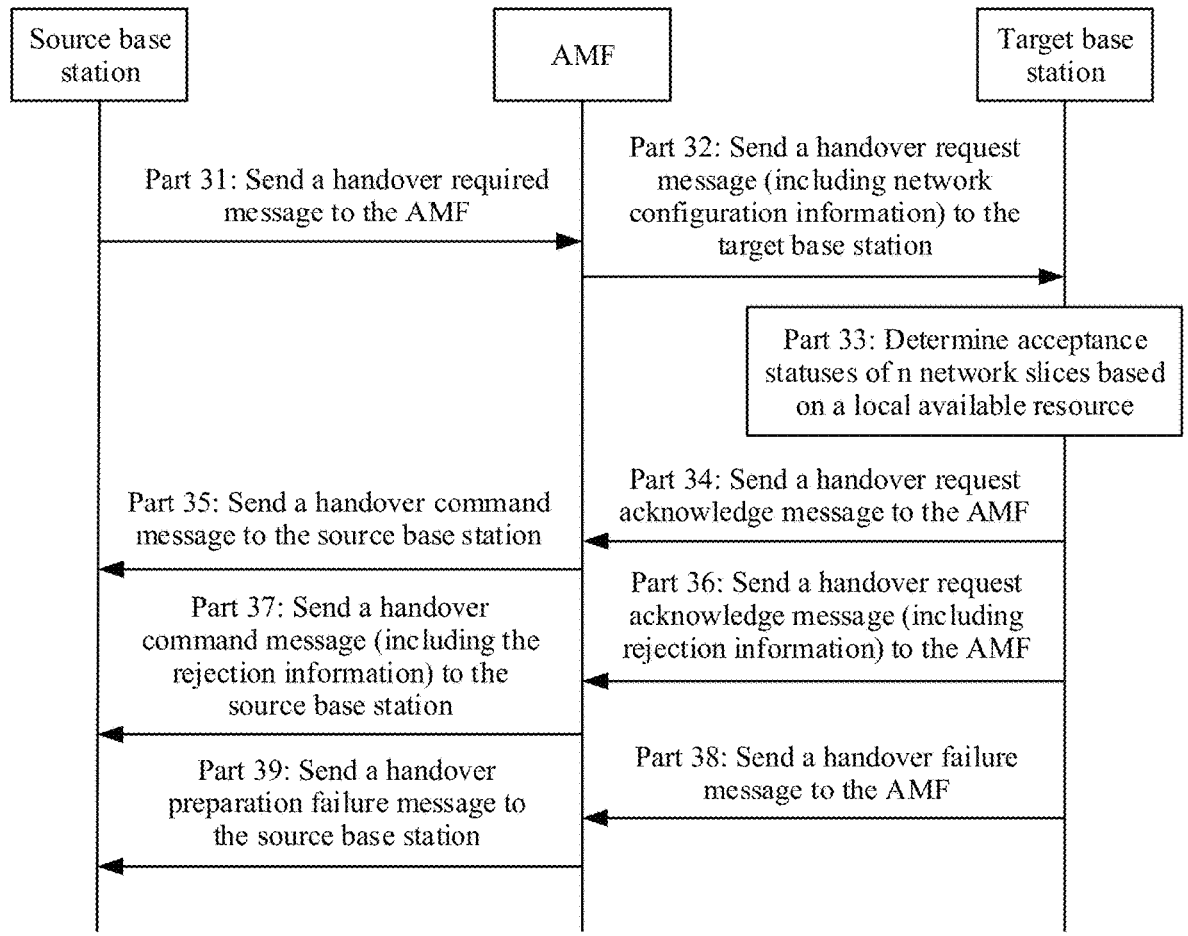
FIG. 10 is a third schematic flowchart of an example of a communication method.

Based on the embodiments shown in FIG. 9 and FIG. 3, FIG. 10 is a schematic flowchart of an example of a communication method. In FIG. 10:

Part 31: The source base station sends a handover required message to the AMF.

Part 32: The AMF sends a handover request message to the target base station, where the message includes network configuration information.

Optionally, the handover request message sent by the AMF to the target base station includes but is not limited to: identifiers of k PDU sessions that need to be handed over from the source base station to the target base station, S-NSSAI of each of n network slices corresponding to the k PDU sessions, and the network slice configuration information.

It should be noted that, in this embodiment, the AMF buffers all configurations of network slices on the source base station. Therefore, the handover required message sent by the source base station to the AMF may not carry the network slice configuration information.

Part 33: The target base station determines acceptance statuses of the n network slices based on a local available resource and/or a local policy.

In an example, the target base station may accept requirements of the n network slices, and a part 34 is performed.

In another example, the target base station may reject requirements of m network slices, and a part 36 is performed, where m is greater than or equal to 0 and less than n.

In still another example, the target base station may reject requirements of the n network slices, and a part 38 is performed.

Part 34: The target base station sends a handover request acknowledge message to the AMF.

Part 35: The AMF sends a handover command message to the source base station.

Specifically, after receiving the handover request acknowledge message, the AMF sends the handover command message to the source base station.

Part 36: The target base station sends a handover request acknowledge message to the AMF.

Optionally, the message includes rejection information used to indicate that the target base station rejects maximum data rates provided by the m network slices for the UE.

Optionally, the message includes recommendation information used to indicate a maximum data rate that is provided by at least one network slice for the UE and that can be supported by the target base station. The at least one network slice belongs to the rejected network slices.

Part 37: The AMF sends a handover command message to the source base station.

Specifically, after receiving the handover request acknowledge message, the AMF sends the handover command message to the source base station.

Optionally, the message includes the rejection information used to indicate that the target base station rejects the maximum data rates provided by the m network slices for the UE.

Optionally, the message includes the recommendation information used to indicate the maximum data rate that is provided by the at least one network slice for the UE and that can be supported by the target base station. The at least one network slice belongs to the rejected network slices.

Part 38: The target base station sends a handover failure message to the AMF.

Optionally, the message includes rejection information used to indicate that the target base station rejects maximum data rates provided by the n network slices for the UE.

Optionally, the message includes recommendation information used to indicate a maximum data rate that is provided by at least one network slice for the UE and that can be supported by the target base station. The at least one network slice belongs to the rejected network slices.

Part 39: The AMF sends a handover preparation failure message to the source base station.

Specifically, after receiving the handover failure message, the AMF sends the handover preparation failure message to the source base station.

Optionally, the message includes the rejection information used to indicate that the target base station rejects the maximum data rates provided by the n network slices for the UE.

Optionally, the message includes the recommendation information used to indicate the maximum data rate that is provided by the at least one network slice for the UE and that can be supported by the target base station. The at least one network slice belongs to the rejected network slices.

It should be noted that rejecting a network slice means rejecting a PDU session corresponding to the network slice. Therefore, in this application, "a reason why a network slice is rejected is that the target base station does not support a maximum data rate provided by the network slice for the UE" may be: A reason why a PDU session is rejected is that the target base station does not support the maximum data rate provided by the network slice for the UE, and they both have a same meaning.

Figure 11:
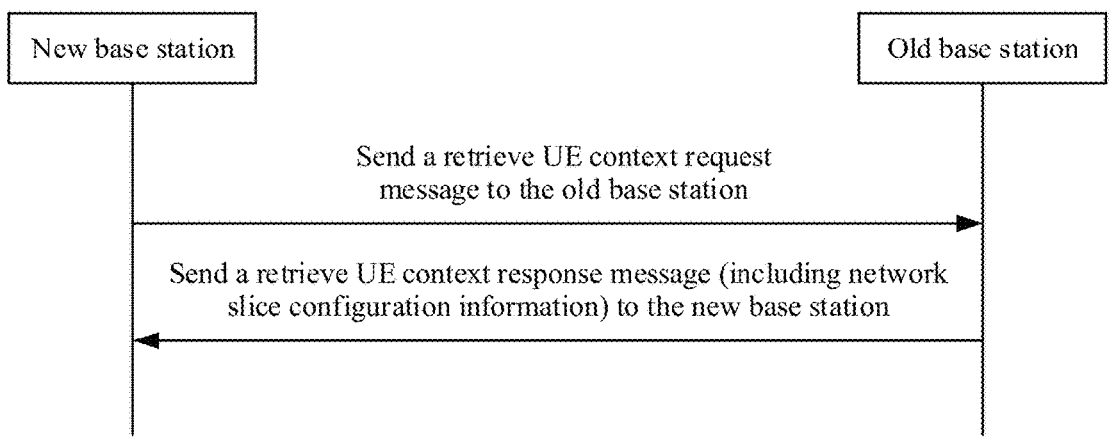
FIG. 11 is a sixth schematic flowchart of a communication method according to an embodiment of this application.

Optionally, in this application, the first network device may alternatively be a new base station, and the second network device may be an old base station, as shown in FIG. 11. In this scenario, when UE is in an inactive state, the UE moves from the old base station to the new base station, and the UE requests to be switched from the inactive state to an active state. Correspondingly, the new base station needs to obtain a UE context from the old base station, and in a process of obtaining the UE context, the new base station may obtain, from the old base station end, a maximum data rate provided by a network slice for the UE. Specifically, refer to FIG. 11. After receiving an RRC resume request message sent by the UE, the new base station may send a retrieve UE context request message to the old base station, where the retrieve UE context request message is used to request the old base station to transfer the UE context to the new base station. Then, the old base station sends a retrieve UE context response message to the new base station, where the message includes network slice configuration information used to indicate maximum data rates provided by n network slices for the UE. The new base station may determine, based on a local available resource and/or a local policy, whether to accept the maximum data rates provided by the n network slices for the UE, and perform operations such as RRC connection reconfiguration on the UE based on maximum data rates provided by accepted network slices for the UE. It should be noted that, in this embodiment, the new base station does not need to send a second message to the old base station.

The foregoing mainly describes the solutions provided in the embodiments of this application from a perspective of interaction between the network elements. It may be understood that, to implement the foregoing functions, network devices (including the first network device and the second network device) include hardware structures and/or software modules corresponding to execution of the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the network device may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. In an actual implementation, another division manner may be used.

Figure 12:
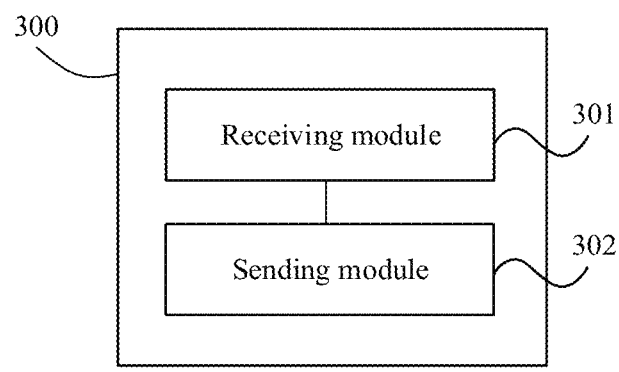
FIG. 12 is a schematic diagram of a structure of a first network device according to an embodiment of this application.

When each function module is obtained through division based on each corresponding function, in an example, FIG. 12 is a schematic diagram of a possible structure of a first network device 300 in the foregoing embodiments. As shown in FIG. 12, the first network device may include a receiving module 301 and a sending module 302. The receiving module 301 may be configured to perform a step of "receiving a first message from a second network device." For example, the module may be configured to support the first network device in performing step 101, step 201, step 301, step 401, and step 501 in the foregoing method embodiments. The sending module 302 may be configured to perform a step of "sending a second message to the second network device." For example, the module may be configured to support the first network device in performing step 102, step 202, step 302, step 402, and step 502 in the foregoing method embodiments.

Figure 13:
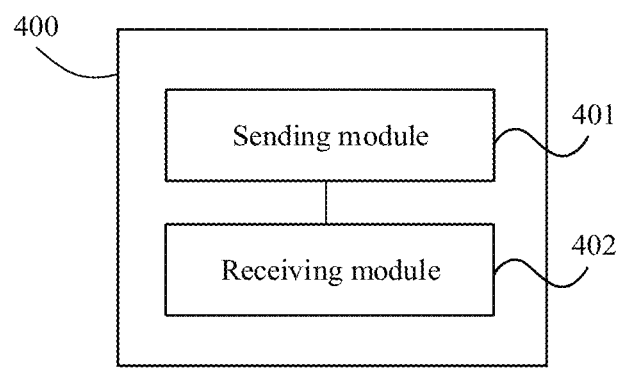
FIG. 13 is a schematic diagram of a structure of a second network device according to an embodiment of this application.

In an example, FIG. 13 is a schematic diagram of a possible structure of a second network device 400 in the foregoing embodiments. As shown in FIG. 13, the second network device may include a sending module 401 and a receiving module 402. The sending module 401 may be configured to perform a step of "sending a first message to a first network device". For example, the module may be configured to support the second network device in performing step 101, step 201, step 301, step 401, and step 501 in the foregoing method embodiments. The receiving module 402 may be configured to perform a step of "receiving a second message from the first network device." For example, the module may be configured to support the second network device in performing step 102, step 202, step 302, step 402, and step 502 in the foregoing method embodiments.

Figure 14:
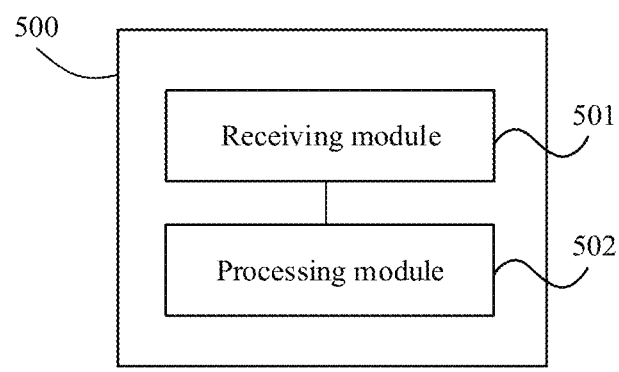
FIG. 14 is a schematic diagram of a structure of a first network device according to an embodiment of this application.

In another embodiment, FIG. 14 is a schematic diagram of a possible structure of a first network device 500 in the foregoing embodiments. As shown in FIG. 14, the first network device 500 may include a receiving module 501 and a processing module 502. The receiving module 501 may be configured to perform a step of "receiving a first message from a second network device". The processing module 502 may be configured to perform a step of "performing resource scheduling and/or admission control on n network slices based on network slice configuration information". The first network device 500 may perform related steps in the embodiment shown in FIG. 11, and details are not described herein again.

Figure 15:
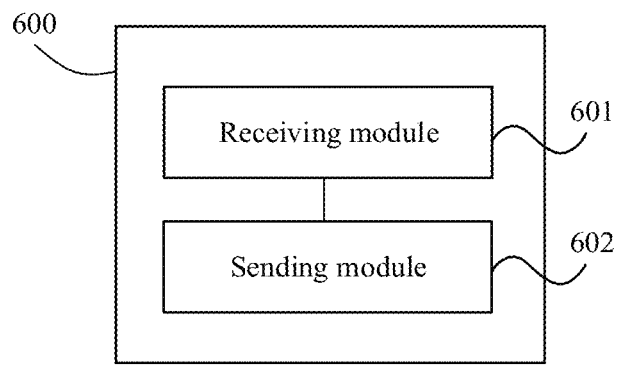
FIG. 15 is a schematic diagram of a structure of a first network device according to an embodiment of this application.

In still another embodiment, FIG. 15 is a schematic diagram of a possible structure of a first network device 600 in the foregoing embodiments. As shown in FIG. 15, the first network device 600 may include a receiving module 601 and a sending module 602. The receiving module 601 may be configured to perform a step of "receiving a first message sent by a second network device." For example, the module may be configured to support the first network device in performing the part 31 in the foregoing method embodiments. The sending module 602 may be configured to perform a step of "sending a second message to a third network device after the receiving module receives the first message." For example, the module may be configured to support the first network device in performing the part 32 in the foregoing method embodiments. The receiving module 601 is further configured to perform a step of "receiving a third message sent by the third network device." For example, the module may be configured to support the first network device in performing the part 34, the part 36, and the part 38 in the foregoing method embodiments. The sending module 602 is further configured to perform a step of "sending a fourth message to the second network device after the receiving module receives the third message." For example, the module may be configured to support the first network device in performing the part 35, the part 37, and the part 39 in the foregoing method embodiments. The first network device 600 may perform related steps in the embodiment shown in FIG. 10.

Figure 16:
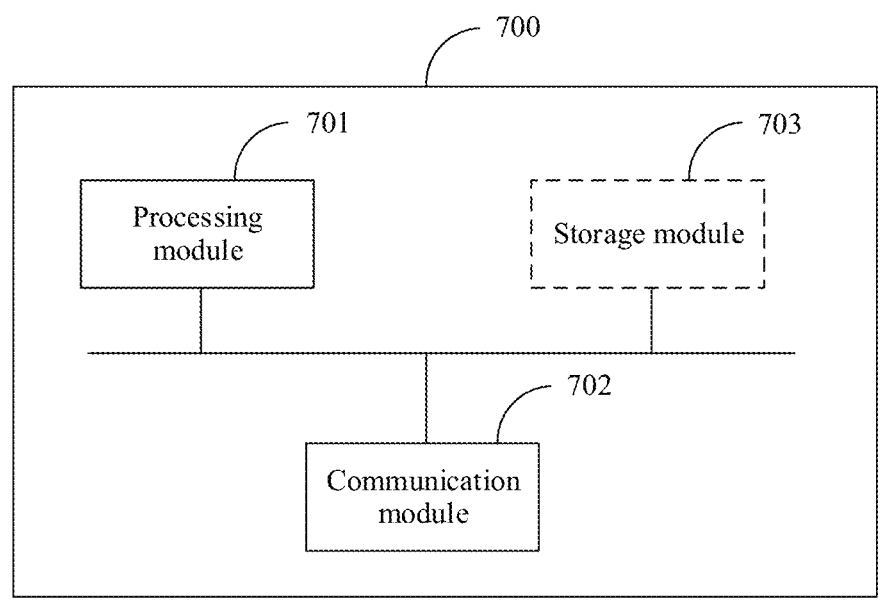
FIG. 16 is a schematic diagram of a structure of an apparatus according to an embodiment of this application.

The following describes an apparatus 700 provided in an embodiment of this application. Details are shown in FIG. 16.

The apparatus includes a processing module 701 and a communication module 702. Optionally, the apparatus further includes a storage module 703. The processing module 701, the communication module 702, and the storage module 703 are connected through a communication bus.

The communication module 702 may be an apparatus having a transceiver function, and is configured to communicate with another network device or a communication network.

The storage module 703 may include one or more memories, and the memory may be a component that is in one or more devices or circuits and that is configured to store a program or data.

The storage module 703 may exist independently, and is connected to the processing module 701 through the communication bus. Alternatively, the storage module may be integrated with the processing module 701.

The apparatus 700 may be used in a network device, a circuit, a hardware component, or a chip.

The apparatus 700 may be the network device in the embodiments of this application, for example, a base station 102 or a base station 103. A schematic diagram of a base station may be shown in FIG. 2. Optionally, the communication module 702 of the apparatus 700 may include an antenna and a transceiver of the base station, for example, the antenna 205 and the transceiver 203 in FIG. 2. The communication module 702 may further include a network interface of the base station, for example, the network interface 204 in FIG. 2.

The apparatus 700 may be a chip in the network device (for example, a source base station or an AMF) in the embodiments of this application. The communication module 702 may be an input or output interface, a pin, a circuit, or the like. Optionally, the storage module may store computer-executable instructions of the method on the base station side, to enable the processing module 701 to perform the method on the base station side in the foregoing embodiments. The storage module 703 may be a register, a cache, a RAM, or the like, and the storage module 703 may be integrated with the processing module 701. The storage module 703 may be a ROM or another type of static storage device that can store static information and instructions, and the storage module 703 may be independent of the processing module 701. Optionally, with development of a wireless communication technology, the transceiver may be integrated on the apparatus 700. For example, the communication module 702 integrates the transceiver 203 and the network interface 204.

When the apparatus 700 is the network device or the chip in the network device in the embodiments of this application, the method performed by the network device in the foregoing embodiments may be implemented.

An embodiment of this application further provides a computer-readable storage medium. All or some of the methods described in the foregoing embodiments may be implemented by using software, hardware, firmware, or any combination thereof. If the methods are implemented in software, functions may be stored as one or more instructions or code on the computer-readable medium or transmitted on a computer-readable medium. The computer-readable medium may include a computer storage medium and a communication medium, and may further include any medium capable of transferring a computer program from one place to another. The storage medium may be any available medium accessible to a computer.

In an optional design, the computer-readable medium may include a RAM, a ROM, an EEPROM, a CD-ROM or another optical disc memory, a magnetic disk memory or another magnetic storage device, or any other medium that can be configured to carry or store required program code in a form of instructions or a data structure and that may be accessed by the computer. In addition, any connection may be appropriately referred to as a computer-readable medium. For example, if software is transmitted from a website, a server, or another remote source by using a coaxial cable, a fiber optical cable, a twisted pair, a digital subscriber line (DSL), or wireless technologies (for example, infrared ray, radio, and microwave), the coaxial cable, the fiber optical cable, the twisted pair, the DSL, or the wireless technologies such as infrared ray, radio and microwave are included in the definition of a medium. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. The combination described above should also be included in the scope of the computer-readable medium.

An embodiment of this application further provides a computer program product. All or some of the methods described in the foregoing embodiments may be implemented by using software, hardware, firmware, or any combination thereof. If implemented in software, all or some of the methods may be implemented in a form of the computer program product. The computer program product includes one or more computer instructions. When the computer program instructions are loaded and executed on a computer, all or some of the procedures or functions described according to the foregoing method embodiments are generated. The computer may be a general-purpose computer, a special-purpose computer, a computer network, a network device, user equipment, or another programmable apparatus.

The embodiments of this application are described above with reference to the accompanying drawings. However, this application is not limited to the foregoing specific implementations. The foregoing specific implementations are to be considered as only illustrative but not restrictive. Various forms made by a person of ordinary skill in the art under the teachings of this application without departing from the protection scope of the purpose and claims of this application shall fall within the protection of this application.

What is claimed is:

1. A communication method comprises:
receiving, by a first network device, a first message from a second network device, wherein the first message comprises network slice configuration information, the network slice configuration information is used to indicate a maximum data rate provided by each of n network slices for a terminal device, and n is an integer greater than or equal to 1, wherein the network slice configuration information comprises:
first indication information that indicates an aggregate bit rate provided by each of the n network slices for an uplink data flow of the terminal device, wherein the uplink data flow comprises at least one of an uplink non-guaranteed bit rate quality of service (non-GBR QoS) flow or an uplink guaranteed bit rate quality of service (GBR QoS) flow of the terminal device; and
second indication information that indicates an aggregate bit rate provided by each of the n network slices for a downlink data flow of the terminal device, wherein the downlink data flow comprises at least one of a downlink non-GBR QoS flow or a downlink GBR QoS flow; and
sending, by the first network device, a second message to the second network device, wherein the second message is in response to the first message.

2. The method according to claim 1, wherein:
the first message is a handover request message;
the first message is a UE context setup request message or a UE context modification request message;
the first message is a bearer context setup request message or a bearer context modification request message;
the first message is a secondary node addition request message or a secondary node modification request message; or
the first message is a protocol data unit (PDU) session resource setup request message or an initial context setup request message.

3. The method according to claim 1, wherein:
the second message is a handover request acknowledge message;
the second message is a UE context setup response message or a UE context modification response message;
the second message is a bearer context setup response message or a bearer context modification response message;
the second message is a secondary node addition request acknowledge message or a secondary node modification request acknowledge message; or
the second message is a PDU session resource setup response message or an initial context setup response message.

4. The method according to claim 1, wherein the second message indicates that the first network device rejects configuration requirements of maximum data rates provided by m network slices for the terminal device, and m is an integer greater than or equal to 0 and less than or equal to n.

5. The method according to claim 4, further comprising:
sending, by the first network device, rejection information to the second network device, wherein the rejection information indicates that a reason why the first network device rejects the configuration requirements of maximum data rates provided by m network slices is that the first network device does not support the maximum data rates provided by the m network slices for the terminal device.

6. A communication method comprises:
sending, by a second network device, a first message to a first network device, wherein the first message comprises network slice configuration information, the network slice configuration information is used to indicate a maximum data rate provided by each of n network slices for a terminal device, and n is an integer greater than or equal to 1, wherein the network slice configuration information comprises:
first indication information that indicates an aggregate bit rate provided by each of the n network slices for an uplink data flow of the terminal device, wherein the uplink data flow comprises at least one of an uplink non-guaranteed bit rate quality of service (non-GBR QoS) flow or an uplink guaranteed bit rate quality of service (GBR QoS) flow of the terminal device; and second indication information that indicates an aggregate bit rate provided by each of the n network slices for a downlink data flow of the terminal device, wherein the downlink data flow comprises at least one of a downlink non-GBR QoS flow or a downlink GBR QoS flow; and receiving a second message from the first network device, wherein the second message is in response to the first message.

7. The method according to claim 6, wherein:
the first message is a handover request message;
the first message is a UE context setup request message or a UE context modification request message;
the first message is a bearer context setup request message or a bearer context modification request message;
the first message is a secondary node addition request message or a secondary node modification request message; or
the first message is a protocol data unit (PDU) session resource setup request message or an initial context setup request message.

8. The method according to claim 6, wherein:
the second message is a handover request acknowledge message;
the second message is a UE context setup response message or a UE context modification response message;
the second message is a bearer context setup response message or a bearer context modification response message;
the second message is a secondary node addition request acknowledge message or a secondary node modification request acknowledge message; or
the second message is a PDU session resource setup response message or an initial context setup response message.

9. The method according to claim 6, wherein the second message indicates that the first network device rejects configuration requirements of maximum data rates provided by m network slices for the terminal device, and m is an integer greater than or equal to 0 and less than or equal to n.

10. The method according to claim 9, further comprising:
receiving, by the second network device, rejection information from the first network device, wherein the rejection information indicates that a reason why the first network device rejects the configuration requirements of maximum data rates provided by m network slices is that the first network device does not support the maximum data rates provided by m network slices for the terminal device.

11. A communication apparatus, comprising at least one processor; and
one or more memories are coupled to the at least one processor and storing programming instructions for execution by the at least one processor to perform operations comprising:
receiving a first message from a network device, wherein the first message comprises network slice configuration information, the network slice configuration information is used to indicate a maximum data rate provided by each of n network slices for a terminal device, and n is an integer greater than or equal to 1, wherein the network slice configuration information comprises:
first indication information that indicates an aggregate bit rate provided by each of the n network slices for an uplink data flow of the terminal device, wherein the uplink data flow comprises at least one of an uplink non-guaranteed bit rate quality of service (non-GBR QoS) flow or an uplink guaranteed bit rate quality of service (GBR QoS) flow of the terminal device; and second indication information that indicates an aggregate bit rate provided by each of the n network slices for a downlink data flow of the terminal device, wherein the downlink data flow comprises at least one of a downlink non-GBR QoS flow or a downlink GBR QoS flow; and sending a second message to the network device, wherein the second message is in response to the first message.

12. The communication apparatus according to claim 11, wherein:
the first message is a handover request message;
the first message is a UE context setup request message or a UE context modification request message;
the first message is a bearer context setup request message or a bearer context modification request message;
the first message is a secondary node addition request message or a secondary node modification request message; or
the first message is a protocol data unit (PDU) session resource setup request message or an initial context setup request message.

13. The communication apparatus according to claim 11, wherein:
the second message is a handover request acknowledge message;
the second message is a UE context setup response message or a UE context modification response message;
the second message is a bearer context setup response message or a bearer context modification response message;
the second message is a secondary node addition request acknowledge message or a secondary node modification request acknowledge message; or
the second message is a PDU session resource setup response message or an initial context setup response message.

14. The communication apparatus according to claim 11, wherein the second message indicates that the communication apparatus rejects configuration requirements of maximum data rates provided by m network slices for the terminal device, and m is an integer greater than or equal to 0 and less than or equal to n.

15. The communication apparatus according to claim 14, wherein the operations further comprise:
sending rejection information to the network device, wherein the rejection information indicates that a reason why the communication apparatus rejects the configuration requirements of maximum data rates provided by m network slices is that the communication apparatus does not support the maximum data rates provided by m network slices for the terminal device.

16. A non-transitory computer-readable storage medium storing one or more programming instructions executable by at least one processor to cause a first network device to perform operations comprising:
receiving a first message from a second network device, wherein the first message comprises network slice configuration information, the network slice configuration information is used to indicate a maximum data rate provided by each of n network slices for a terminal device, and n is an integer greater than or equal to 1, wherein the network slice configuration information comprises:
- first indication information that indicates an aggregate bit rate provided by each of the n network slices for an uplink data flow of the terminal device, wherein the uplink data flow comprises at least one of an uplink non-guaranteed bit rate quality of service (non-GBR QoS) flow or an uplink guaranteed bit rate quality of service (GBR QoS) flow of the terminal device; and
- second indication information that indicates an aggregate bit rate provided by each of the n network slices for a downlink data flow of the terminal device, wherein the downlink data flow comprises at least one of a downlink non-GBR QoS flow or a downlink GBR QoS flow; and sending a second message to the second network device, wherein the second message is in response to the first message.

17. The non-transitory computer-readable storage medium according to claim 16, wherein:
- the first message is a handover request message;
- the first message is a UE context setup request message or a UE context modification request message;
- the first message is a bearer context setup request message or a bearer context modification request message;
- the first message is a secondary node addition request message or a secondary node modification request message; or
- the first message is a protocol data unit (PDU) session resource setup request message or an initial context setup request message.

18. The non-transitory computer-readable storage medium according to claim 16, wherein:
- the second message is a handover request acknowledge message;
- the second message is a UE context setup response message or a UE context modification response message;
- the second message is a bearer context setup response message or a bearer context modification response message;
- the second message is a secondary node addition request acknowledge message or a secondary node modification request acknowledge message; or
- the second message is a PDU session resource setup response message or an initial context setup response message.

19. The non-transitory computer-readable storage medium according to claim 16, wherein the second message indicates that the first network device rejects configuration requirements of maximum data rates provided by m network slices for the terminal device, and m is an integer greater than or equal to 0 and less than or equal to n.

20. The non-transitory computer-readable storage medium according to claim 19, wherein the operations further comprise:
- sending, by the first network device, rejection information to the second network device, wherein the rejection information indicates that a reason why the first network device rejects the configuration requirements of maximum data rates provided by m network slices is that the first network device does not support the maximum data rates provided by m network slices for the terminal device.

* * * * *